(12) United States Patent
Bradley

(10) Patent No.: US 8,909,209 B2
(45) Date of Patent: Dec. 9, 2014

(54) APPARATUS AND METHOD FOR INHIBITING PORTABLE ELECTRONIC DEVICES

(71) Applicant: James Roy Bradley, Montreal (CA)

(72) Inventor: James Roy Bradley, Montreal (CA)

( * ) Notice: Subject to any disclaimer, the term of this patent is extended or adjusted under 35 U.S.C. 154(b) by 266 days.

(21) Appl. No.: 13/670,985

(22) Filed: Nov. 7, 2012

(65) Prior Publication Data

US 2014/0162616 A1    Jun. 12, 2014

Related U.S. Application Data

(60) Provisional application No. 61/556,501, filed on Nov. 7, 2011.

(51) Int. Cl.
*H04M 3/00* (2006.01)
*H04W 24/00* (2009.01)

(52) U.S. Cl.
CPC ............... *H04W 24/00* (2013.01); *Y02B 60/50* (2013.01)
USPC ............... 455/418; 455/420; 381/59; 381/82

(58) Field of Classification Search
CPC ................................... H04W 24/00
USPC ................. 455/418, 420; 381/59, 89
See application file for complete search history.

(56) References Cited

U.S. PATENT DOCUMENTS

| 6,950,525 | B2 * | 9/2005 | Harrell et al. | 381/59 |
| 8,379,874 | B1 * | 2/2013 | Simon | 381/82 |
| 2011/0065375 | A1 * | 3/2011 | Bradley | 455/1 |

* cited by examiner

*Primary Examiner* — Amancio Gonzalez

(57) ABSTRACT

This accessory is apparatus capable of implementing a method that can affect one or more features of a portable electronic device when brought into a vehicle having a radio with a right and a left speaker. The accessory has a sender for initiating transmission of an RF test signal at the portable electronic device. The RF test signal is arranged to cause the radio to produce a distinct pair of audio responses from the right and the left speaker. The accessory has a discriminator for determining for the right and the left speaker the corresponding return delay between transmission of the RF test signal and arrival of the distinct pair of audio responses at the portable electronic device.

29 Claims, 22 Drawing Sheets

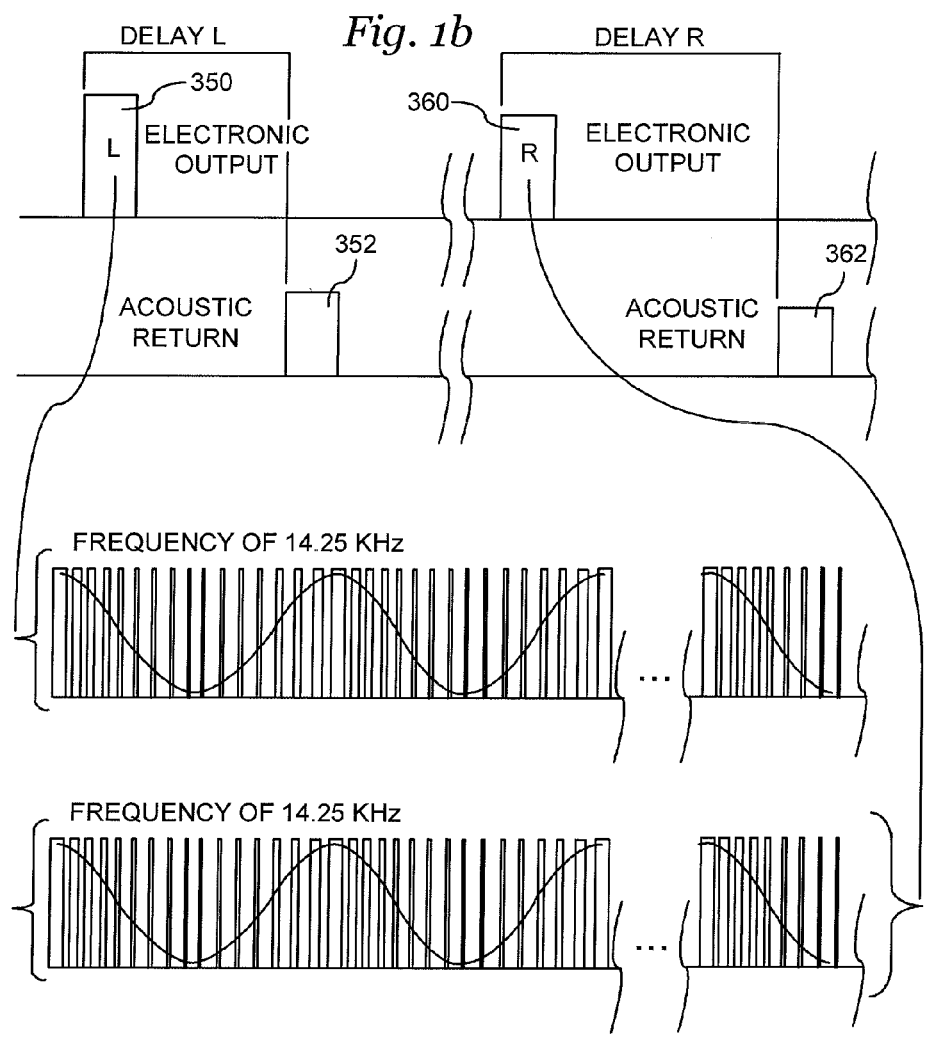

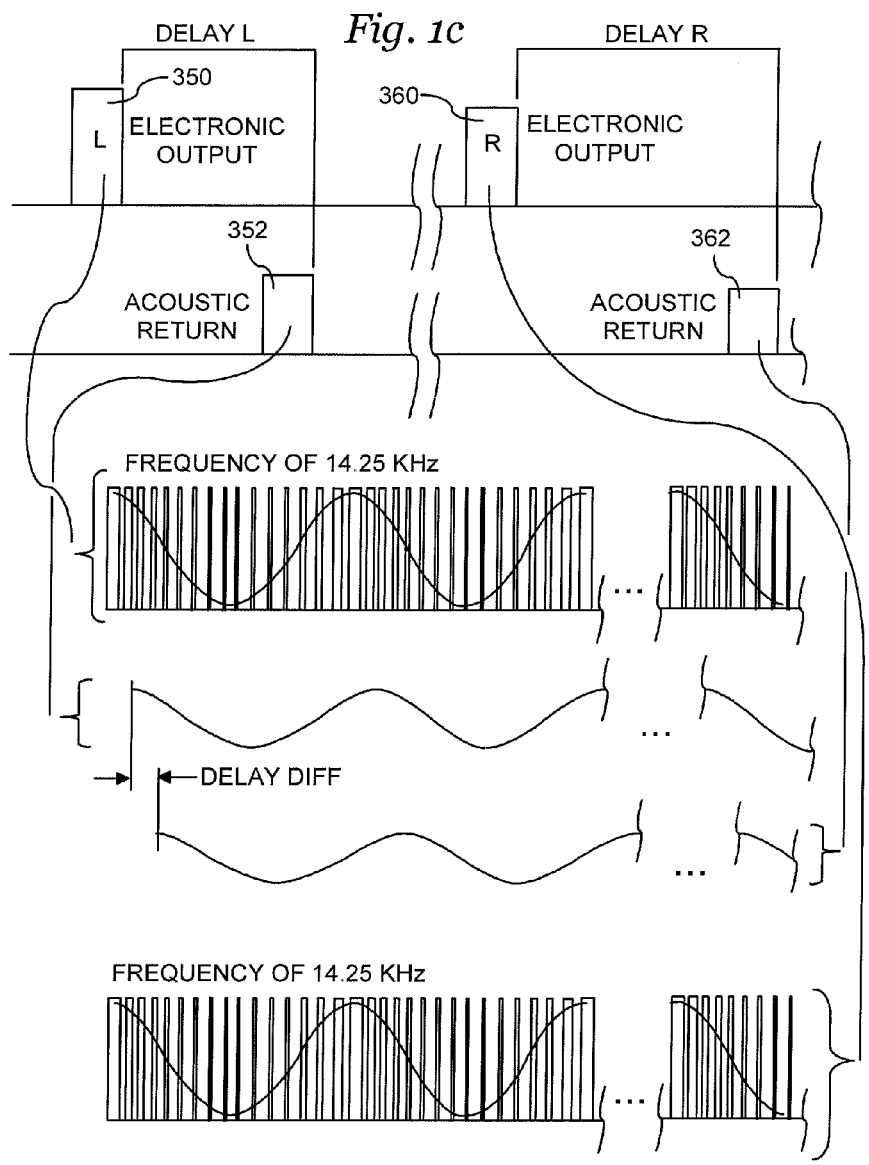

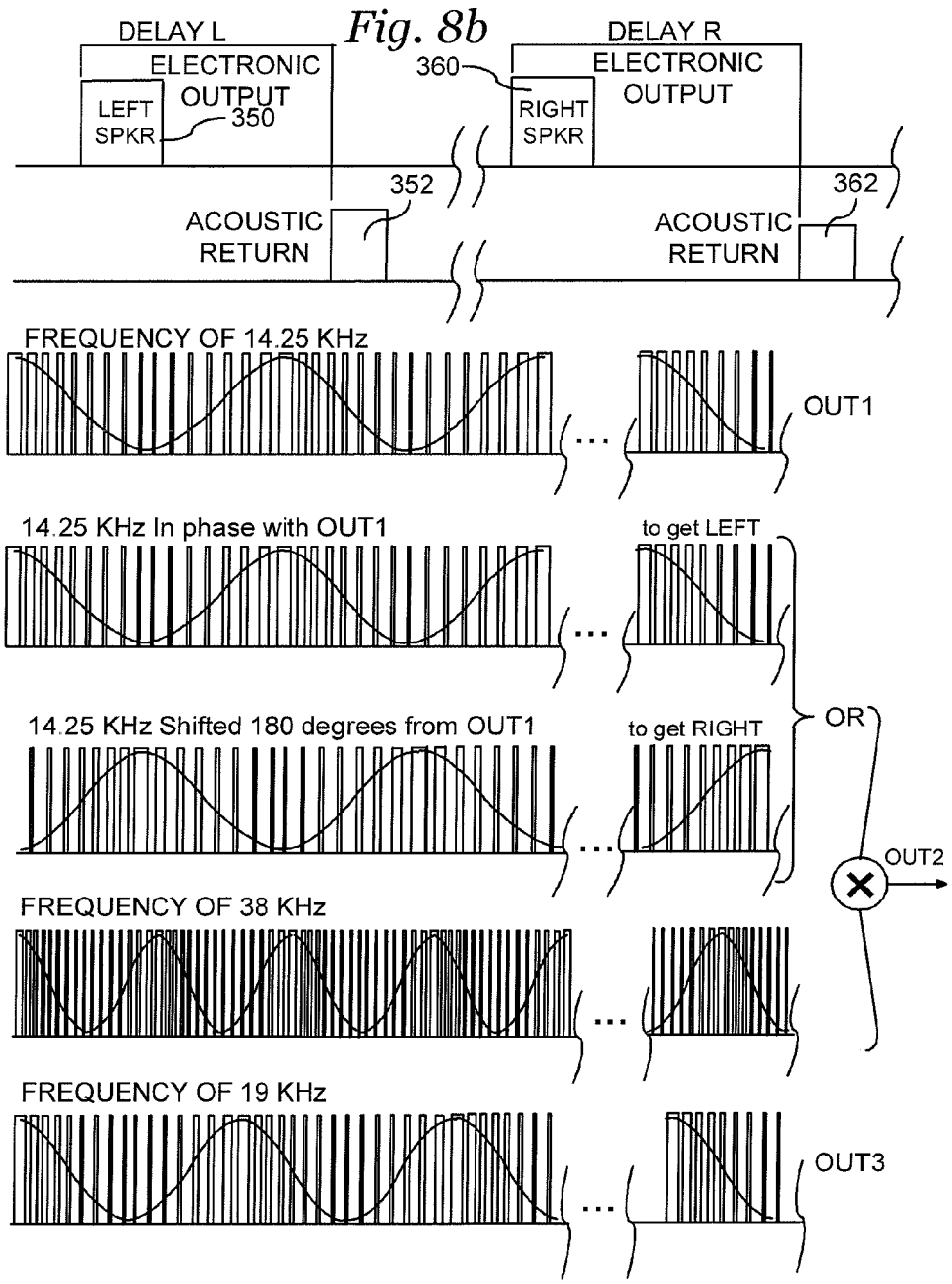

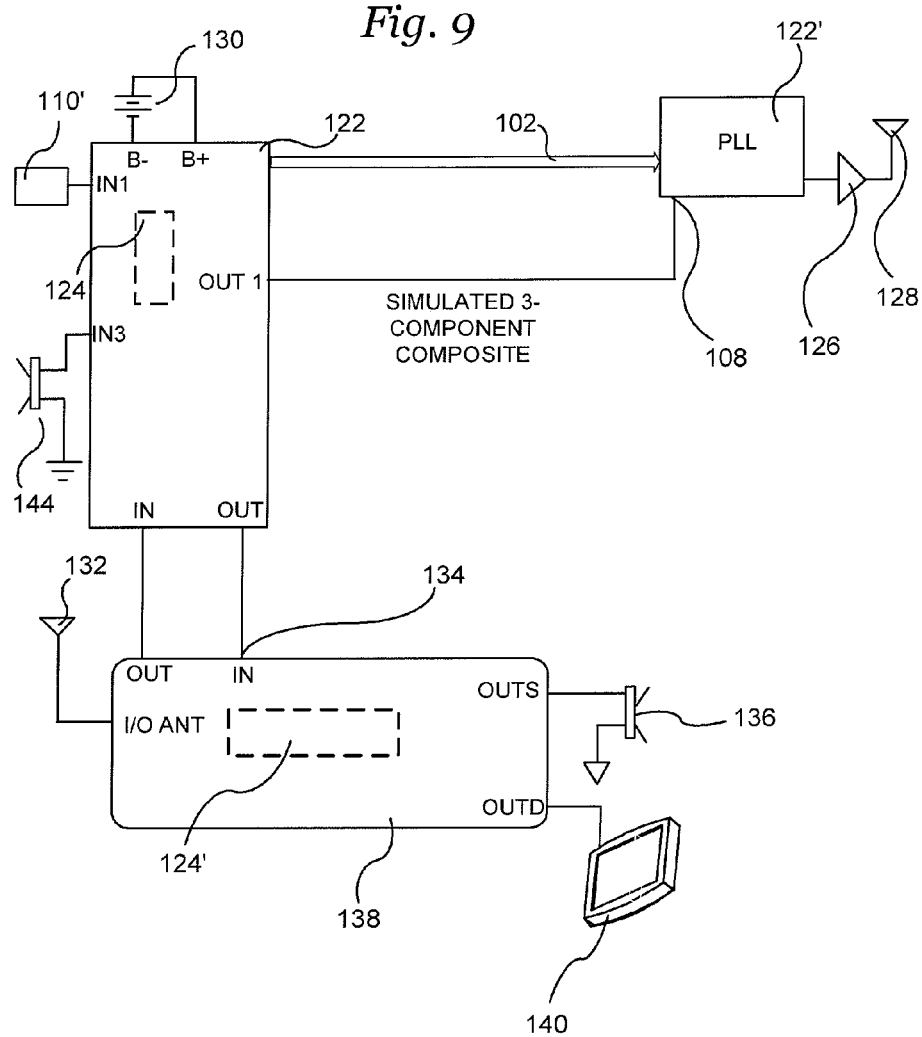

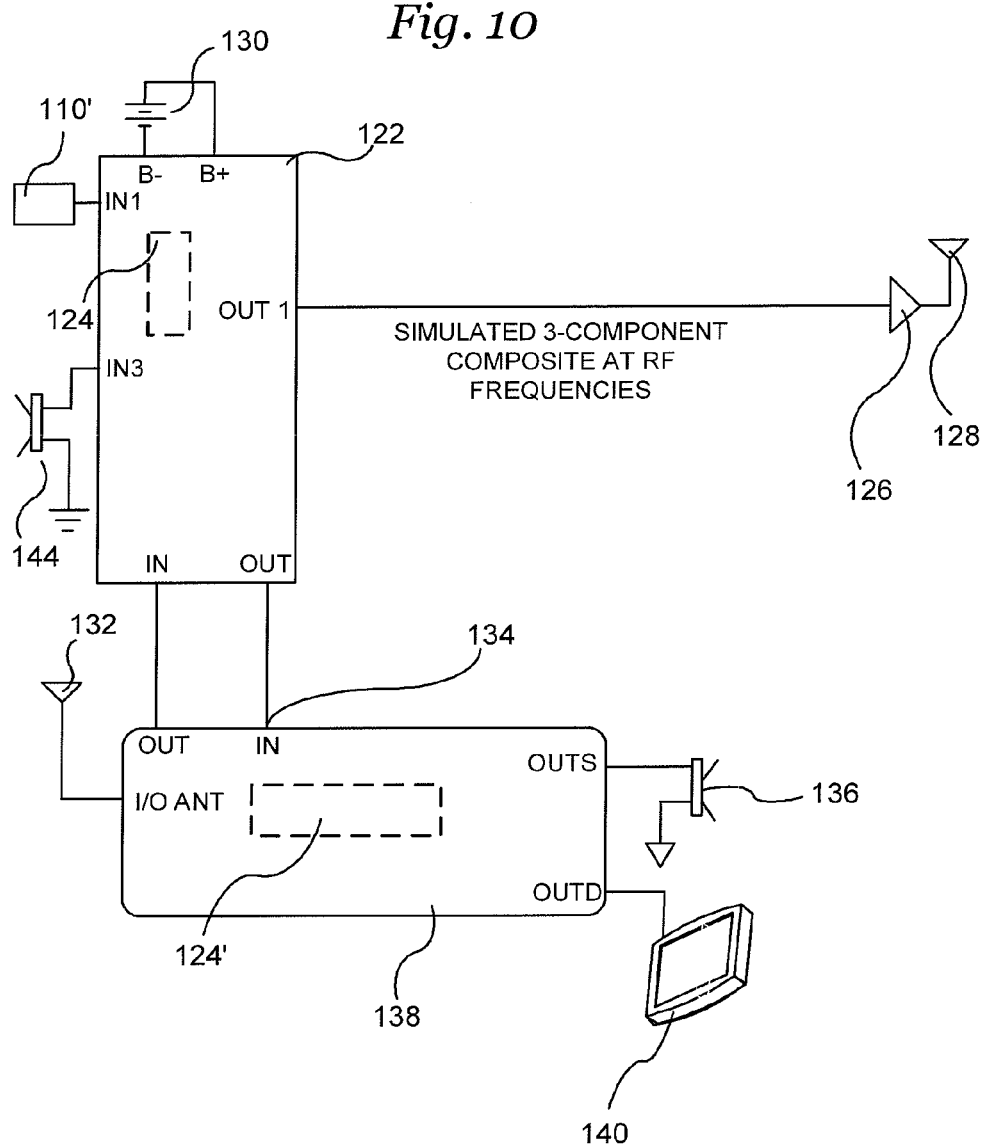

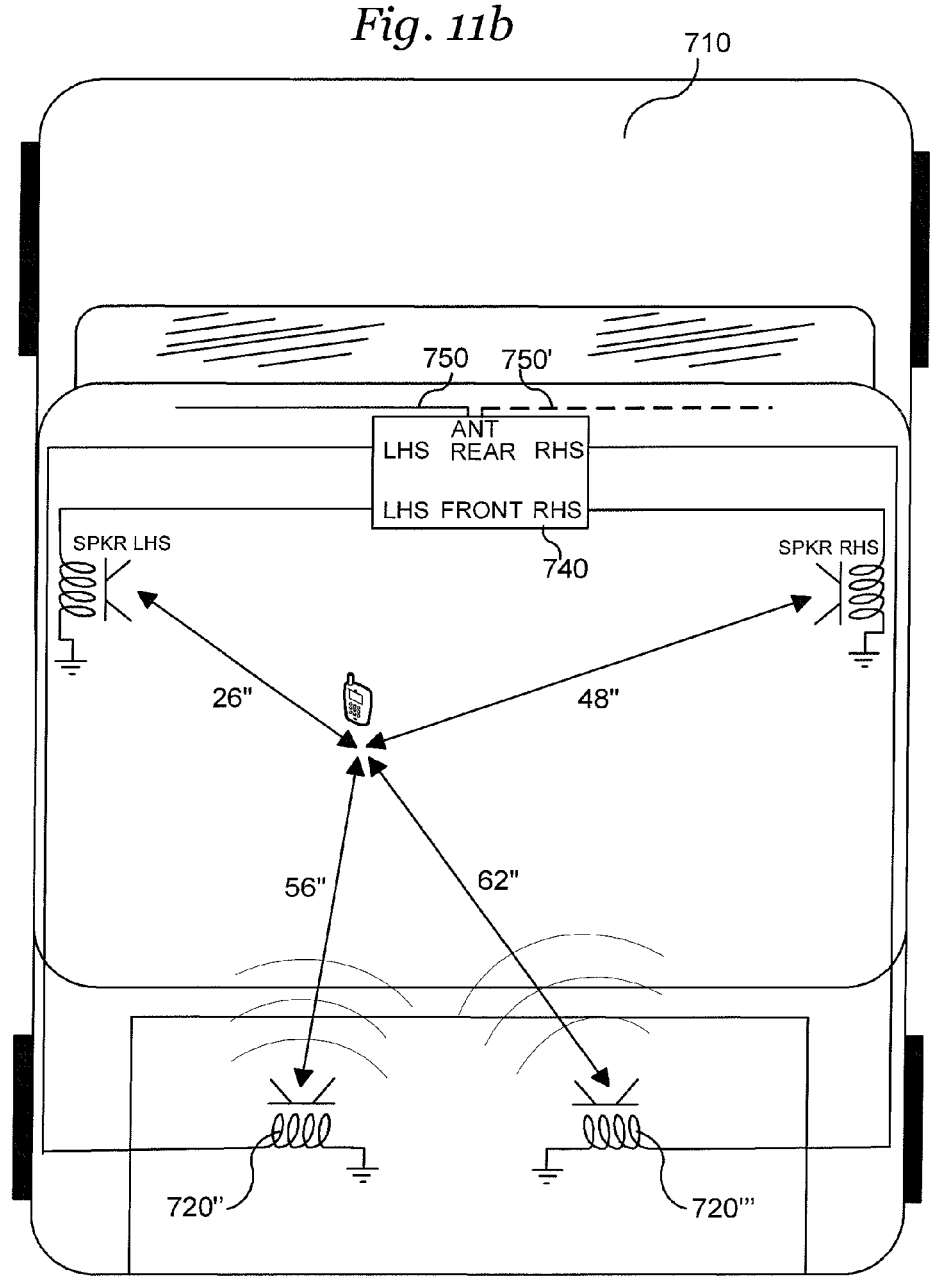

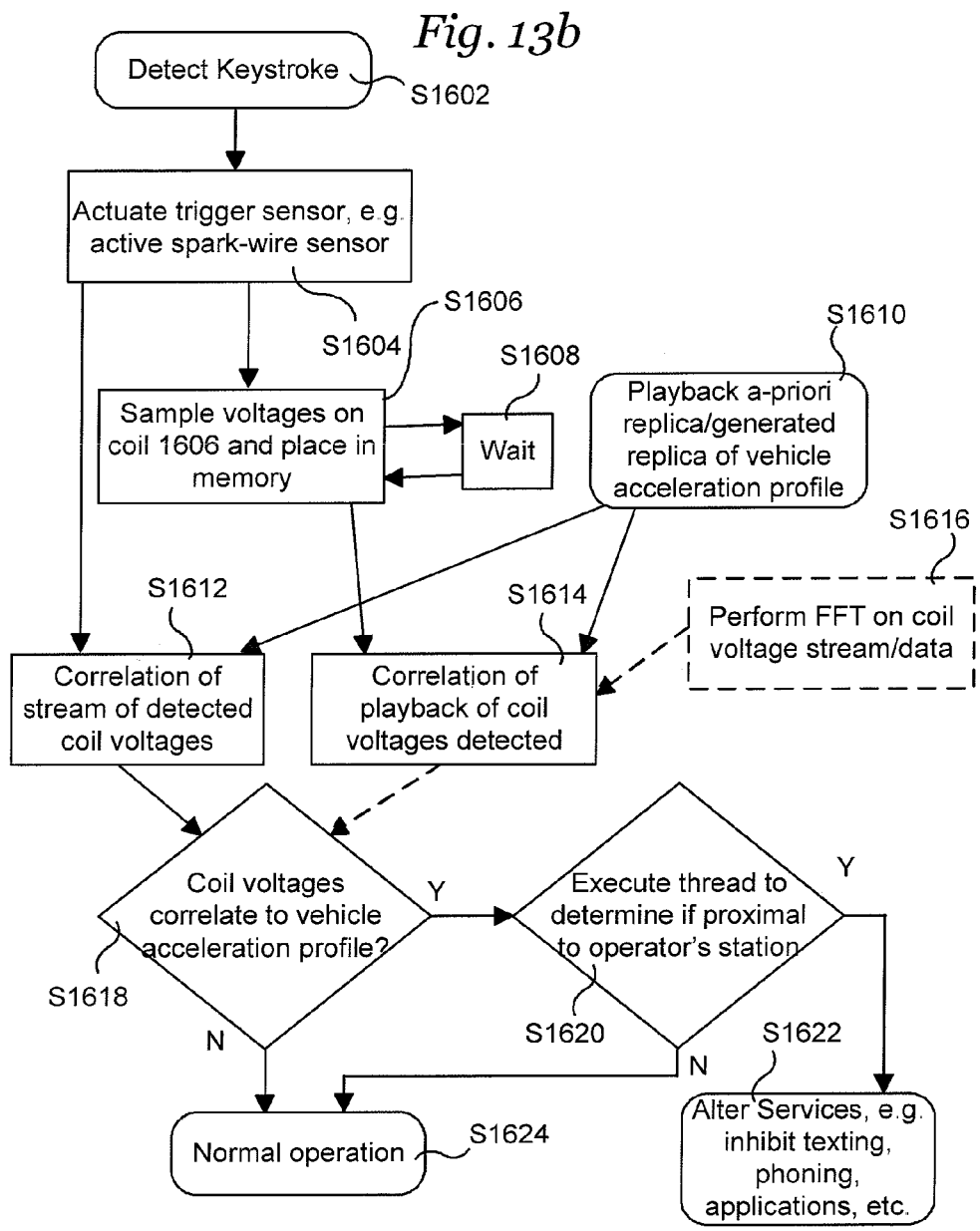

APPARATUS AND METHOD FOR INHIBITING PORTABLE ELECTRONIC DEVICES

CROSS-REFERENCES TO RELATED APPLICATIONS

This application claims the benefit of U.S. Provisional Patent Application Ser. No. 61/556,501, filed 7 Nov. 2011, the contents of which are hereby incorporated by reference herein.

BACKGROUND OF THE INVENTION

1. Field of the Invention

The present invention relates to portable electronic devices and apparatus and methods for altering the devices' services and applications, based on proximity to a vehicular operator's station.

2. Description of the Related Art

Some hazard exists with respect to the use of a portable electronic device by motor vehicle operators, be it cell phone conversations, texting, application execution, or otherwise.

Many different patents and patent applications address the issue of phoning or texting while driving. See U.S. Pat. Nos. 5,871,232; 6,690,940; 7,343,148; 7,856,230; and 7,966,025, as well as US Patent Application Publication Nos. 2008/0214211; 2009/0111422; and 2010/0216509. For specialized equipment mounted in a vehicle to perform triangulation, see US Patent Application Publication Nos. 2011/0021234; 2011/0105097; and 2011/0195699.

See also US Patent Application Nos. 2008/0305779; 2008/0305780; 2008/0305808; 2008/0318562; 2008/0299954; 2008/0299959; and 2011/0117903. See the website www.Key2safedriving.com.

Many of the known systems rely on modified vehicles, portable device heading sensors, or portable device navigation elements.

On the other hand, there is economic pressure by transportation services to not inhibit moving cell phone users, for fear of losing fares from vehicle passengers. There is pressure as well on the cell phone manufacturers not to require a change in infrastructure for such technology, i.e., a change in vehicle infrastructure is burdensome.

In U.S. Patent Application Publication No. 2011/0117903, the present inventor explains many different scenarios to attain precise velocity, and heading information to permit the determination of location of portable electronic devices.

See also "Detecting Driver Phone use Leveraging Car Speakers", by Jie Yang et al., Mobicom, 2011, (published after the present invention by the present inventor).

SUMMARY OF THE INVENTION

In accordance with the illustrative embodiments demonstrating features and advantages of the present invention, there is provided an accessory for affecting one or more features of a portable electronic device that can be brought into a vehicle having a radio with a right and a left speaker. The accessory includes a sender for initiating transmission of an RF test signal at the portable electronic device. The RF test signal is arranged to cause the radio to produce a distinct pair of audio responses from the right and the left speaker. The accessory also includes a discriminator for determining for the right and the left speaker the corresponding return delay between transmission of the RF test signal and arrival of the distinct pair of audio responses at the portable electronic device.

In accordance with another feature of the present invention, a method is provided for affecting one or more features of a portable electronic device that can be brought into a vehicle having a radio with a right and a left speaker. The method includes the step of initiating transmission of an RF test signal at the portable electronic device. The RF test signal is arranged to cause the radio to produce a distinct pair of audio responses from the right and the left speaker. The method also includes the step of determining for the right and the left speaker the corresponding return delay between transmission of the RF test signal and arrival of the distinct pair of audio responses at the portable electronic device.

A disclosed device and method for disabling portable electronic devices has in some cases an acceleration-sensing element usable to provide acceleration signals indicative of vehicular motion. This device and method further exploit indications of operator station proximity by interrogating entertainment equipment, e.g., the FM radio, AM radio, satellite radio, or otherwise. The device and method optionally exploit a frequency response technique to prevent spoofing by audio equipment of other than similar frequency response characteristics, such as, a portable FM radio, a walkman, or an MP3 player, etc. Cases determined to be other than an acceptable response result in the removal of services, the removal of network access, a change in application usage, a notification, or any combination of the above.

This device and method are suitable for inhibiting or disabling portable electronic devices such as cell phones, smart phones, portable navigation devices (PND's), tablet computers, etc. from use while at the driver's seat, without restricting operation in seats other than the driver's seat. This inhibited use may inhibit texting, phoning, applications execution, tagging, informing a network, attempts to phone, establishing a fact or activity, or otherwise.

Suitably equipped portable electronic devices deemed to be in a vehicle due to the detection of simple accelerations, or Radio Frequency (RF) signals indicative of such, are subjected to tests that can further limit operation or intended operation, to avoid the likelihood of being operated proximal to the vehicle operator's station. Portable electronic devices deduced to be operated proximal to the operator's station, or otherwise failing the tests, have services removed, altered, or added. It is expected that this will typically be the removal of telephonic communications, texting and application use, proximal to the operator station.

In the present disclosure all hardware to be added may be installed on the portable electronic device. No vehicular infrastructure, or vehicular changes are required.

The present disclosure exploits a built-in transmitter. The transmitter, commonly being, but not restricted to being, a Frequency Modulated (FM) transmitter. In other embodiments the modulation is that of a satellite radio, e.g., X-modulation (XM) radio, Sirius radio. In yet other embodiments it is one of an Amplitude (analog) Modulation (AM) transmission, a Quadrature Phase Modulated (QPSK) transmission, a Bi-phase modulated (BPSK) transmission, a Quadrature-Amplitude (QAM) transmission, Sequence Spread Spectrum (DSSS) or other type of transmission.

The present disclosure exploits the very low latency of RF to audio conversion used by FM radios to ensure coherency between left and right channels, and to ensure coherency between front and rear channels, when equipped.

Embodiments of the present disclosure inhibit texting while only in the operator's station of a motorized vehicle.

Some embodiments of the present disclosure further inhibit applications while the device is located proximal to the operator's station.

The present disclosure ensures that the additional power consumption by transmissions by a portable electronic device occurs only for recent, at least partially sustained, accelerations, indicative of a vehicle in motion above a threshold, through detection by an acceleration sensor to determine times corresponding to use, attempted use, corresponding to the potentially dangerous condition of driving while texting, driving while phoning, driving while adjusting a portable electronic device application execution profile, or combinations thereof, and changes the availability of such services, or informs a server, network, user, or combination thereof.

The present disclosure exploits very low power transmission. In comparison, frequency-hopping technologies, such as Bluetooth, commonly transmit at a set power level to comply with the standard, resulting in transmission beyond the immediate vehicle. This results in higher than required power consumption in a portable device, a condition that is to be avoided. Some embodiments of the present disclosure exploit a profile, adjustable in FM modulation index to permit the minimum RF signal strength at which the electronic/acoustic control loop is established and maintained, thereby further saving power and optimizing the avoidance of RF signal spillage beyond the immediate vehicle.

A disclosed embodiment defeats an attempt at spoofing by arranging portable devices to create a left for right and right for left contra-arrangement simulating non-operator side operation, which would avoid the use restrictions otherwise applied. For this reason, some embodiments of the present disclosure implement acoustic domain anti-spoofing by at least partially sensing acoustic domain frequency performance for pre-distorted RF signals transmitted. The pre-distortion applied to the signal being transmitted corresponds to the FM frequency roll-off designed into FM receivers to enhance the higher frequency performance versus the corresponding background noise during nominal use.

The device of the present disclosure has broad applicability to the present fleet of vehicles, which in general, are equipped with FM stereo receivers. In some embodiments, the present disclosure permits for satellite radio, AM radio, other radio system, or combination thereof.

Embodiments of the present disclosure offer near-optimum frequencies implemented on commonly available processing units.

Embodiments of the present disclosure greatly reduce the hardware required to implement the system.

Embodiments of the present disclosure inhibit use above a threshold speed or acceleration profile over time, and thereby preventing inhibit circumvention through use of a headset, whilst the device is located on the passenger seat, i.e. Bradley "DEVICE AND METHOD FOR DISABLING MOBILE DEVICES", Patent Application Publication No. 2011/0117903.

Moreover, the present disclosure requires the user to have available a working FM system, or the like, otherwise the portable electronic device will alter services, etc., i.e., inhibit texting, phoning, phoning without a hands-free arrangement, as if the vehicular location test failed.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein:

FIG. 1b is a representation of output signals that are produced in the embodiment of FIG. 1, as well as exemplary signals that are returned in response thereto;

FIG. 1c is a representation of signals with a timing that is an alternate to that of FIG. 1b;

FIG. 8b is a representation of output signals that are produced in the embodiment of FIG. 8, as well as exemplary signals that are returned in response thereto;

FIG. 9 is schematic block diagram that is an alternate to those of FIGS. 1 and 8, with further reduced component count;

FIG. 10 is a schematic block diagram that is an alternate to those of FIGS. 1, 8 and 9, with further reduction in component count;

FIG. 11b is a schematic diagram showing a specific placement of the portable electronic device in the environment of FIG. 11;

FIG. 13b is a control flow chart associated with the embodiment of FIG. 13;

DETAILED DESCRIPTION

Figure 1:
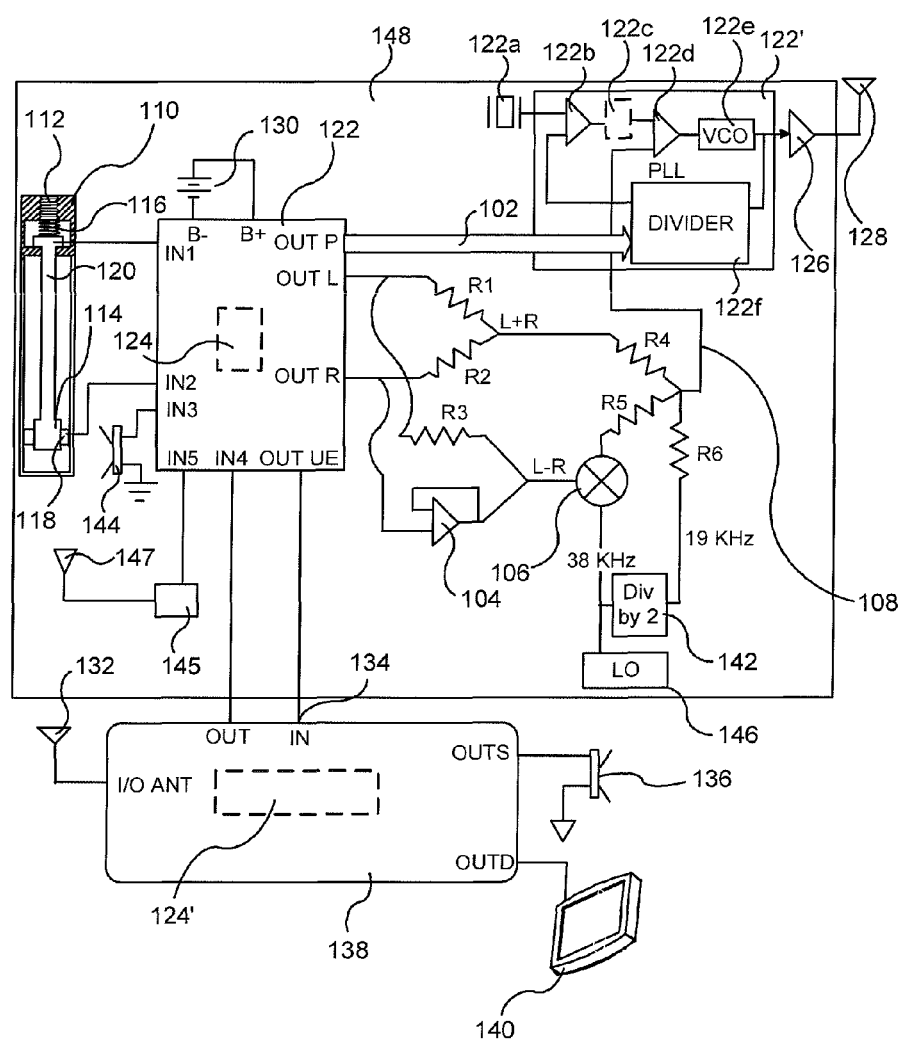
FIG. 1 is a schematic diagram of a portion of an accessory for a portable electronic device, said accessory representing apparatus and methods in accordance with principles of the present invention.

Referring to the schematic block diagram of FIG. 1, accessory 148 can alter services of a portable electronic device 138 (e.g., a cell phone), based on an indication of proximity to a vehicle operator's station. In particular, motion detector 110 (acceleration element, namely an accelerometer), coupled to processor 122, via inputs IN 1, and IN 2. Acceleration element 110 is optionally fabricated in adjustable format, as shown, with set screw 112, compression spring 116, pendulum element 120, and with contact 114, operable to contact contact-ring 118, which in turn is connected to input IN 2 or in some cases ground (ground connection not shown).

Processor 122, has memory element 124, and pins B+ and B− connected to power source 130.

Portable electronic device 138 has optional communications antenna 132 connected to antenna connector I/O ANT. Device 138 also has optional memory 124', and acoustic transducer (i.e., speaker or microphone) 136 that can be used to detect audio signals. In addition, optional output OUT connects to input IN 4 of processor 122 in order to inform the attached accessory 148 of context; for example, motion parameters (e.g., GPS signals) indicative of motor vehicle speeds, or in a further example, attempted cell/smart phone use. Yet another example is an indication of change of cell tower ID, used as an indication of potential use in a moving vehicle. Output pin OUT of portable electronic device 138 is operable to communicate through input pin IN 4 of processing element 122 to send indications of intent-to-use or otherwise.

Portable electronic device 138 has input IN, used by the processor 122 over interface 134 to indicate to the portable electronic device the need to change the permissible services, commonly a texting and/or telephonic communications inhibition, a disabling, or specific enabling. This interface 134 is not limited to a dual-level static condition and can be a bi-directional serial, or parallel bus, driven by the apparatus 122 via port OUT UE.

Processor 122 uses output pin OUT UE to output indications of use, or intended use, proximal to operator's station of cell phone calls, smart-phone use, application use, or network access.

Portable electronic device 138, has further output OUTD, which communicates with screen 140. Screen 140 is not limited to a receive channel only, and can optionally be a touch screen or otherwise. The communication is also optionally bi-directional, parallel, wireless, or used in any combination.

Phase Locked Loop (PLL) 122' is operable to run at various frequencies in the broadcast band, the FM broadcast band in this embodiment, with frequencies at 200 KHz intervals from approximately 88.100 MHz to approximately 107.900 MHz. Parallel, serial, or otherwise, control signals 102 from processor 122 select the phase locked loop frequency. The locked loop 122' outputs the selected reference frequency for a purpose to be described presently.

Processor 122 has optional acoustic transducer 144, operable to signify an acoustic signal, or lack thereof, via input pin IN 3. Processor 122 has memory element 124, operable to store data, program step sequences, or otherwise.

Processor outputs OUT L and OUT R are operable to output a left and right channel signal, respectively, as shown in FIG. 1b. The left signal from output OUT L is output to summing node L+R via gain setting resistor R1, and to summing node L−R via gain setting resistor R3. In similar fashion, right output OUT R drives summing node L+R, via gain setting resistor R2, and drives summing node L−R, via operational amplifier 104, which inverts the signal. The combined signal at node L−R is mixed by mixer 106 with essentially 38 kHz signal produced by local oscillator 146. In this embodiment mixer 106 uses the difference signal on node L−R to modulate a double side band, suppressed carrier, as is commonly done in commercial FM broadcast systems.

The 38 KHz signal created by local oscillator 146 may, optionally, be created from, or synchronized with the PLL circuit 122', or processing means 122.

The composite 38 KHz×(L−R) signal from mixer 106 is added to a summing node via gain setting resistor R5, along with the sum signal from node L+R via gain setting resistor R4, and a 19 KHz pilot tone via gain setting resistor R6. This pilot tone is created by applying the 38 kHz signal from oscillator 146 to a "divide-by-two" element 142, comprised of a flip-flop, or counter.

The PLL 122' generates the main carrier frequency. In particular, the output of voltage controlled oscillator (VCO) 122e is divided by divider 122f and fed back to an input of phase detector 122b for comparison against the phase of local oscillator 122a. The error signal from phase detector 122b is fed through low pass filter 122c to an input of summing operational amplifier 122d, whose output controls voltage controlled oscillator (VCO) 122e. The output of low pass filter 122c is a signal with a very low sub-carrier frequency, i.e., a slow correction of the main frequency, which, by itself, would leave VCO 122e very close to the nominal carrier frequency. In general these components generate the main frequency, which nominally corresponds to a broadcast frequency.

In contrast, the signal from the R4/R5/R6 summing node contributes high frequency components to the modulation, i.e. the higher the swing, the further from nominal the VCO frequency is. The modulation is effected by applying to an input of operational amplifier 122d the signal at summing node R4/R5/R6, which causes a consequential deviation of the frequency of VCO 122e from nominal. Effectively, apparatus 122' acts as an FM modulator with respect to the modulation signal applied by summing node R4/R5/R6. The summing node's contribution is comprised of the signals at nodes L+R, the 38 KHz modulated signal from mixer 106 (derived from the 38 kHz oscillator 146 and the signal at node L−R), plus the 19 KHz sub-carrier sub-harmonic from divider 142, driven by local oscillator 146. This effectively creates an FM signal in the format that is standard for commercial broadcast FM stations.

This signal goes to VCO 122e is filtered by a band-pass filter (not shown for clarity), amplified by amplifier 126, and transmitted via antenna element 128. In line series capacitance is not shown. The RF signal thus transmitted by antenna 128 is referred to herein as an RF test signal and the apparatus generating the RF test signal is referred to herein as a sender.

As described further hereinafter, the foregoing RF test signals will produce an acoustic response from a radio and this acoustic response can be sensed by acoustic transducer 144. Acoustic signals are optionally sensed by portable electronic device 138, via audio transducer 136, be it a microphone, speaker, combination of both, or otherwise. The transducer handling the acoustic returns are part of a discriminator for measuring return delays, as described further herein.

In this embodiment processor 122 and electronics external to it are arranged on a printed circuit board residing in accessory 148.

Referring to FIG. 1b, the signals initiated by processor 122 include pulses 350 and 360, which are transmitted in sequence from antenna 128. These pulses comprise tone bursts modulated in the usual manner as ordinary FM broadcast signals. The right and left signals are transmitted to each of the individual speakers in turn. In this embodiment, the modulation produces from a vehicle radio a 14.25 kHz tone burst lasting, for example, for 1.0 ms. The two lower waveforms of FIG. 1b indicate that the audio can be constructed from narrow pulses of time-varying width that are generated by the processor 122, and then filtered to produce an audio signal, in this case two audio tones at 14.25 kHz.

This acoustic response, in this case pulses or tone bursts, as detected at any of the acoustic transducers (e.g., transducers 144 or 136 of FIG. 1) is shown as left pulse 352 and right pulse 362. Specifically, left pulse 352 is the acoustic signal returning from a left only pulse and right pulse 362, followed by a right only response. Pulse generation is not limited to this exact style and can without restriction be generated concurrently, left and right signals overlapping partially, exactly, or otherwise.

In other embodiments the right and left signals are distinguished by having different audio frequencies, different timing, different codes (i.e. encoded signals), or combinations of thereof. Basically, the returning audio signals are designed to provide a distinct pair of audio responses.

In some embodiments, the sine wave of the returning acoustic signal is sampled and compared to replicas of the predicted acoustic waveform with various amounts of delay.

A convenient frequency for the right and left acoustic signal (and thus the modulation of the stereo FM carrier) is 14.25 KHz, however, other frequencies can be used in other embodiments. In other embodiments the left audio frequency can be different from the right. In yet other embodiments varying frequencies are used varying either from pulse to pulse or within a pulse. Separation of the left and right signals can be performed by differences in frequency, timing, coding, phase, pulse position, or any other combination of characteristics. In some cases the right and left signals can be transmitted simultaneously. The particular differences are recovered for analysis at baseband after acoustic reception.

In the simplest embodiment, transducer 144 (FIG. 1), senses the signal environment, which is dominated with the short pulses of 14.25 KHz returning from the left and right side. As shown by FIG. 1b, the left side is transmitted and the arrangement waits a preset interval for the returning acoustic signal from the left speaker. Then the right side is transmitted and the arrangement waits a preset interval for the returning acoustic signal form the right speaker.

Referring to FIG. 1c, signals returning from any individual or combination of acoustic sensors are shown as pulses 352 and 362, but in this case delay is measured from the trailing edge of the pulses (leading edge measurement performed in FIG. 1b).

Figure 2:
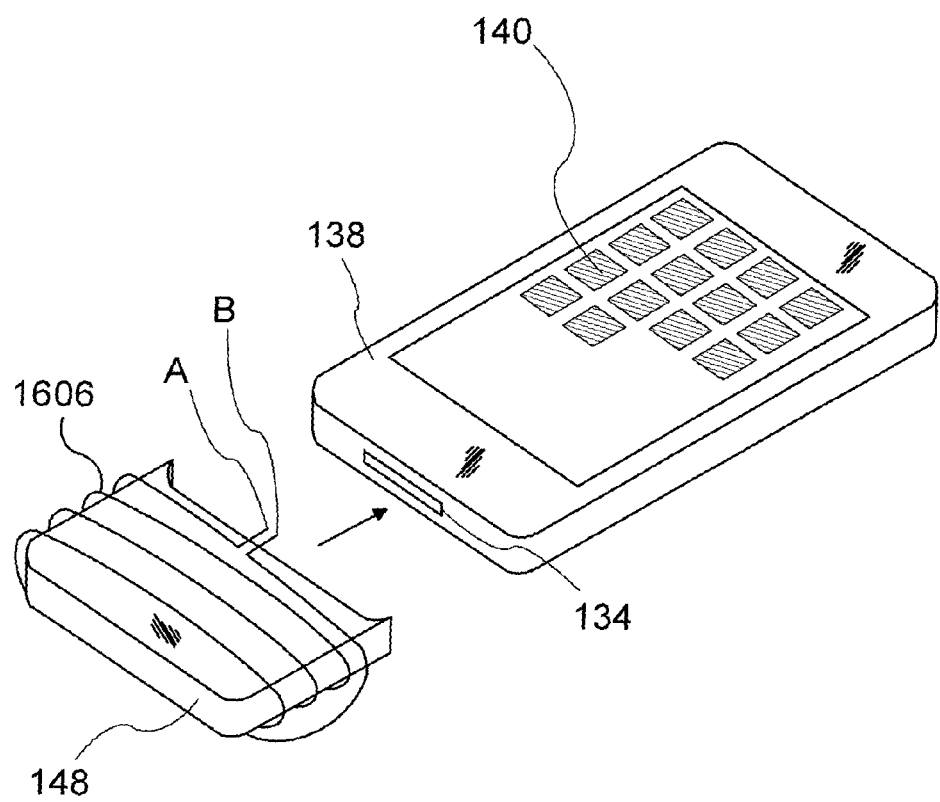
FIG. 2 is perspective view of a portable electronic device equipped with the accessory of FIG. 1.

Referring to FIG. 2, accessory 148 and associated apparatus of FIG. 1 connect to previously mentioned portable electronic device 138, via connector 134. Portable electronic device 138 has display 140.

FIG. 2 shows the arrangement for inhibiting portable electronic devices, 148 attached to portable electronic device, 138, via connector 134. It is understood that connector 138 may be serial, optical, RF, wired, network connection pair, any combination thereof, or any other suitable means for communications. Electro-magnetic signal detector, 1606, comprises a loop, of a plurality of turns, in some cases less than a complete turn, detects signals indicative of sparkplug wiring emissions. Although shown external to the processing element, add on, 148, coil 1606, can equally well be placed internal to portable electronic device, 138. It is understood that all of the processor means, 148, and all attached to 148, in any configuration mentioned in this disclosure, can be internally mounted in portable electronic device 138.

The necessity of approximately balancing the left/right, or in some cases fore/aft, speaker signal strength will be understood by the user.

Figure 3:
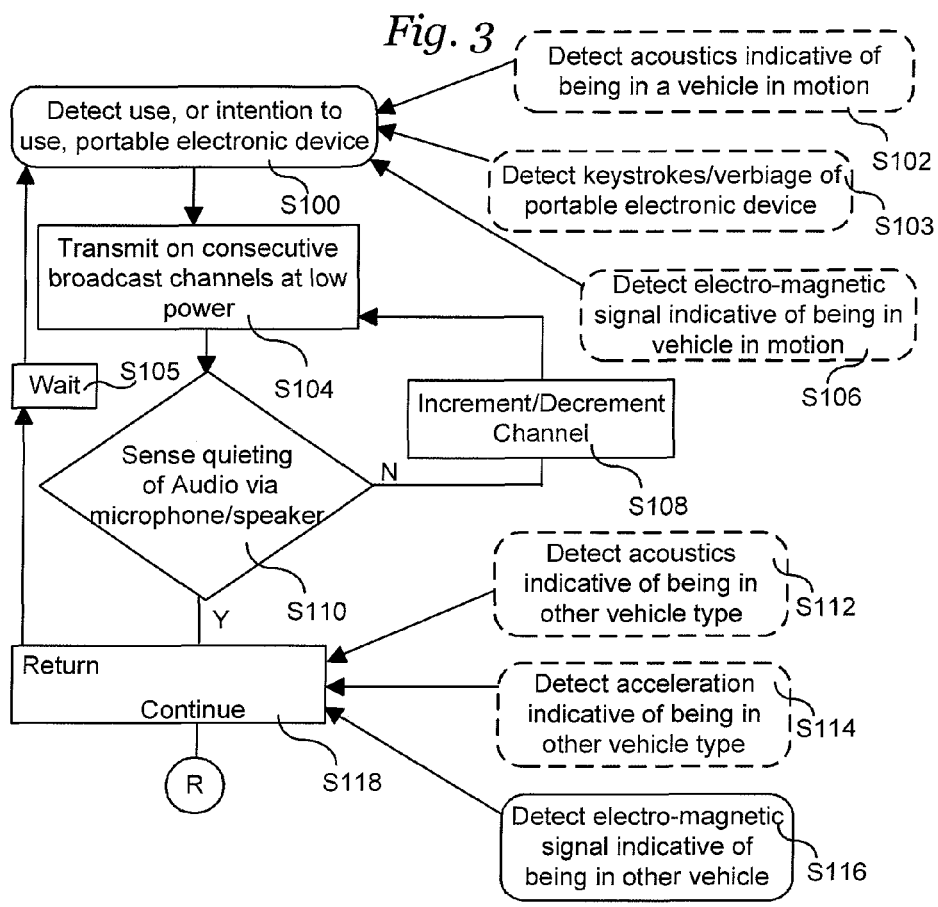
FIG. 3 is a control flow chart associated with the arrangement of FIG. 1 showing optional contextual sensors permitting deduction of the nature of vehicular motion, as well as a sequencing of a probe signal to find an operating channel.

The flowchart of FIG. 3 illustrates the first program thread contained in memory 124 of FIG. 1. Upon detection of acceleration of sufficient intensity and duration, step S100 sequences to step S104. In some embodiments step S100 is replaced by step S102, S103, and S106, or a combination of all four. Step S102 detects the acoustics of a vehicle in motion using transducer 144 or 136 (FIG. 1) and its associated circuitry (referred to herein as a listening circuit). Step S106 detects electromagnetic signals indicative of vehicular motion (e.g., electromagnetic interference from rapid spark plug firing) using antenna 147 to send signals to processor input INS through detector 145 (the foregoing RF detection apparatus being referred to herein as an RF listening circuit).

In one of these ways control is transferred to step S104, which commands a broadcast of an unmodulated carrier, (optionally a modulated carrier), nominally on consecutive, broadcast channel center frequencies. In particular processor 122 (FIG. 1) will issue successive divisor commands along link 102, effectively changing the carrier frequency from VCO 122e. The various RF signals sent via amplifier 126 and antenna 128 are referred to herein as RF probe signals.

In the foregoing embodiment a pure tone is output and the acoustic effect of silencing of the radio channel is acoustically sensed to permit detection of the channel in use. In other embodiments a modulated tone is output and the stronger acoustic signal is sensed as it takes over from the channel in use, and is thus used to permit detection of the channel in use. Basically, the system will detect a predetermined change in the sound from the speakers (left and/or right) caused by the RF probe signal. Some embodiments exploit the use of an unused channel. Some embodiments exploit the use of a channel in use. In some embodiments the selection of which case is in use, i.e., the radio is on or off, is detected by trials of both cases and exploit the case with the higher acoustic signal to noise ratio. This is performed at step S110 of FIG. 3.

Step S110 evaluates whether quieting occurred at the latest carrier frequency. If quieting did not occur the system will increment, decrement, or otherwise progress sequentially through the possible channels/bands in step S108. Probe signals of the nature commanded by step S108 are optionally done separated by time intervals dictated by step S108.

If step S104 does not detect a quieting of the signal after a few cycles of attempting to find a sensitive frequency, (transmit, detect, change frequency, transmit, . . . start over), the system will directly remove/establish services based on this fact, e.g., it will shut down portable device 138 if the radio is not on. In one embodiment, the operator has an optional ability to select a signal to be made in noisy, environments.

In other instances steps S104/S110/S108 will proceed through this sequence and eventually reach the channel to which the radio (illustrated hereinafter) is tuned.

In this embodiment the unmodulated carrier has sufficient power to overwhelm an ordinary broadcast signal and effectively mute the radio. Consequently, step S110 senses a quieting in the acoustic realm by detecting less acoustic input to either of sensors 144 or 136 of FIG. 1.

After detecting the particular frequency of interest, the system may remain on this frequency. In succeeding step S118 the system determines whether it is operating in an alternate vehicle type (e.g., ship, train, or plane) not requiring inhibiting or disabling. The system will examine possible exemptions provided (via a wired or wireless link) at steps S112, S114, and S116. For example, in step S112 the system examines ambient noise to determine whether the vehicle noise indicates, for example, operation in an airplane. In step S114 acceleration signals from accelerometer 110 (FIG. 1) may indicate a train in motion. In step S116 the system may sample ambient RF signals and determine this RF environment indicates usage in a ship. If any of these exemptions apply, a delay interval is implemented in step S105, where the system waits for an expiration of the exemption, before returning to step 100.

Assuming however no exemptions apply, the control flow passes through step S118, where an overall exception determination is made before proceeding to port R for subsequent processing. Basically, if motion is detected in some manner, the sender of FIG. 1 is enabled to send RF test signals through antenna 128.

Figure 4:
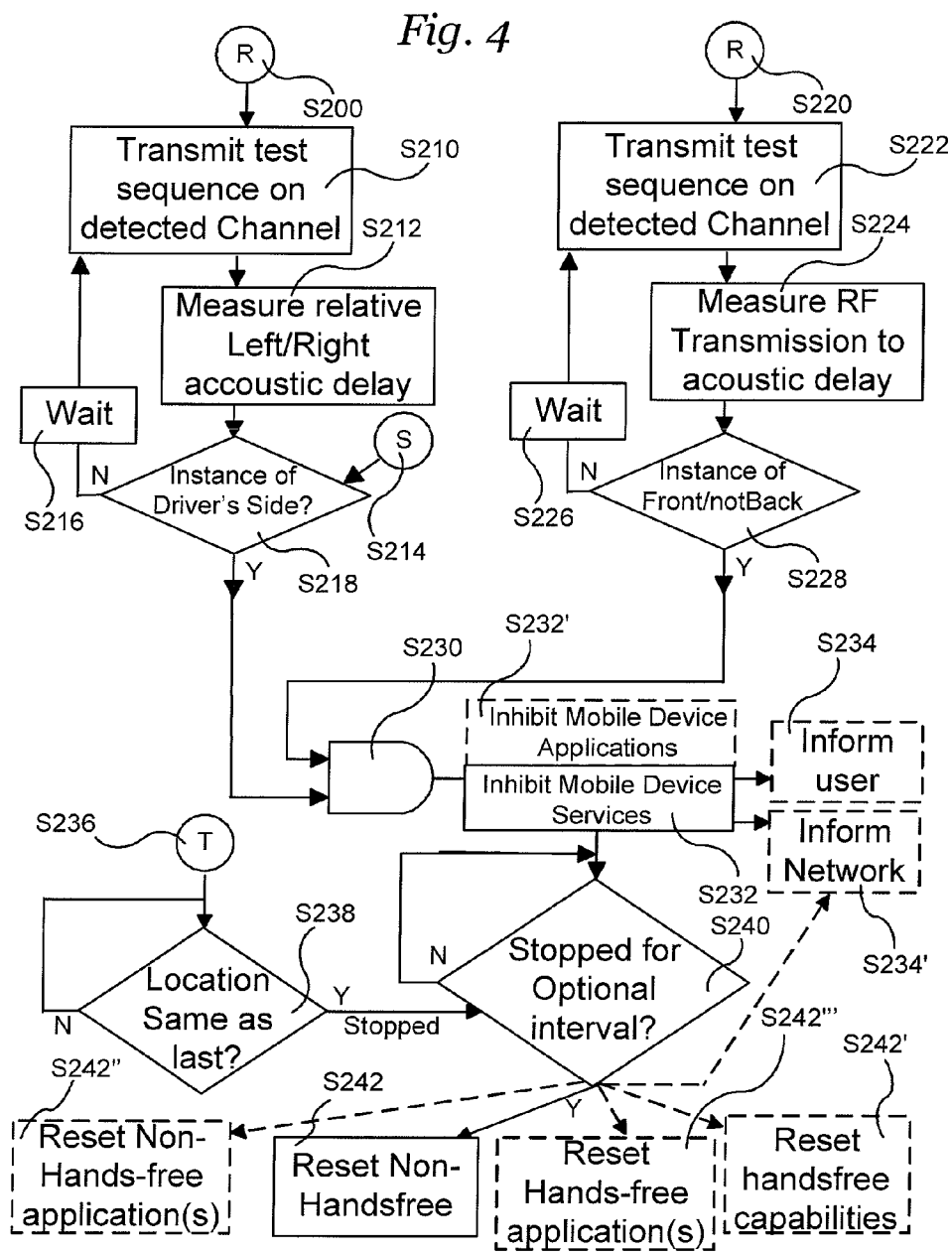
FIG. 4 is a control flow chart associated with the arrangement of FIG. 1, showing left/right and front/back determination branches and reaction functionalities.

FIG. 4 shows two further threads that are stored in memory 124 of processor 122 of FIG. 1. The thread starting at port S200 (also identified here and before as port R) sequences to step S210, which commands processor 122 (FIG. 1) to generate outputs signal at its terminals OUT L and OUT R sequentially, simultaneously, or at least partially overlapped in time. The components previously described in FIG. 1 provide a composite signal at the node R4/R5/R6, which determines the modulation of modulator 122' to produce an FM signal having the carrier frequency determined previously in step S118 of FIG. 3. This FM signal carries right and left channel (stereo) signals in the usual format of a commercial FM station in order to produce an acoustic response from an FM radio in the associated vehicle.

The acoustic signal returning from this test, is correlated with the FM signal that produced the return signal in step S212. In one embodiment, this is as simple as emitting a test signal from the left side only and then sampling the returning acoustic signal and then repeating the process with a signal sent through the right channel, and possibly other channel(s).

In the foregoing test, the response delay of the left channel is compared to the response delay of the right channel. A quicker response in the left channel, compared to the response from the right channel is indicative of a device operating on the vehicle's left side. It is understood that a cluster of left speakers may represent the left speaker and that a right side cluster may represent the right side speaker.

If on the other hand, the round trip on the right channel (from RF signal launch commanding the receiver to output on the right, until the acoustic return) takes less time, operation of the portable electronic device is assumed to be closer to the vehicle's right side. This determination is made at step S218. Optionally determination of the driver's side is made from a vehicle network, or preprogrammed information entering the system at port S.

The speed of the electrical and RF signal paths being so much faster than that of the acoustic path, the latter can be taken to account for essentially all of the time delay.

The speed of sound is approximately 331 m/s. This permits calculation of the comparative distance from the speakers, and in particular, the relative placement between speakers; i.e. a greater distance from the left speaker than the right is assessed as reception on the vehicle's right side. A greater distance from the right speaker is assessed as reception on the vehicle's left side. Taken in conjunction with the information supplied from port S (e.g., the vehicle is a right or left hand drive, based on a priori information, or optionally based on network information) a deduction of portable electronic device operation, or intended operation, proximal to the operator's station or not, in the left/right sense, can be made, at step S218.

At step S220 initializing information is again received via port R. Succeeding step S222 begins transmission of the RF test sequence eventually leading to the acoustic returns. As before, the relative delay between the RF transmission and the returned acoustic signal is measured at step S224 and passed to step S228, where the sum (proportional to average) of the acoustic delays are compared to a threshold value. A delay less than the threshold implies a location in the front seats.

If the a rear location is deduced as the use or intended use, software control is passed to step S226, where the processing waits a period, and then returns to make the assessment again on a repeating basis (i.e., repeating steps S222/S224/S228), optionally during a telephone call, optionally during the portable electronic device use, or optionally during any motion indicative of shifting to the front of a motor vehicle.

If a front location is deduced however at step S228, control is passed to step S230 (an AND function), where an evaluation is made as to the possible concurrence of a location in front (from step S228) and on the operator's side (from step S218). If step S230 ascertains that proximal to the operator's station, use of the portable electronic device is ongoing or intended, steps S232 and S232' are triggered and begin to modify services and/or applications for the portable electronic device, or for devices that the portable electronic device is using, informing or controlling. Commonly, these are cell-phone calls, texting, application execution, application initiation, automated functionality, network activity, or any combination thereof. Upon detection of use, intended use, etc. proximal to the operator's station step S234 informs the user by a screen or distinctive sound of the service being inhibited, disabled, enabled, or otherwise configured or executed. Step S234' likewise sends an electronic notification of the service restrictions to inform the network of the affect on the activity, or intended activity, etc.

Step S232 passes information regarding the affected activity, intended activity etc, to step S240, which determines if the vehicle has been stopped for a preset interval and then restores service for the portable device by resetting the condition (or method) applied at step S232, S232', S234, S234', in any combination or otherwise. These resets take place in steps S242 (reset non-hands-free operation), S242' (reset hands-free capabilities), 242" (reset non-hands-free application(s)), or S242''' (reset hands-free application(s)). In typical embodiments these resets will also disable the sender in accessory 148 of FIG. 1 to stop transmission of RF test signals through antenna 128.

In this embodiment the deduction of being stopped is at least partially implemented with an indication of such by determining in step S238 if the location is the same as the last update or not, using information supplied to the system at step S236 (port T), namely, navigation information, cell-phone ID, or other navigational information at step S238.

In this embodiment, information about the stoppage, or qualified stoppage is passed to step S234' for supplementing the network information.

This information alternatively updates the hands-free or non-hands-free configuration.

In some embodiments the left or right signal reception is ascertained to be an attempt to spoof the system and the portable electronic device is shut off. Spoofing may be attempted by locating the speaker of a portable radio to simulate an acoustic return falsely suggesting the portable electronic device is in a fictitious position for which usage is permitted (e.g., simulating a position on the right). In anti-spoofing systems the acoustic return is evaluated to determine whether its bass content is that typical of small portable radios.

It is understood that some embodiments are configured on the assumption the portable electronic device will be used only as a non-hands-free device without Bluetooth, Zigbee, wire or other element that would permit use in the passenger seat with the headset/microphone elements of the drivers station.

It is to be further understood that a deduction of motion associated with vehicular motion may be determined at least partly by navigation information, and optionally transmitted, or sent to the portable electronic device.

It is further understood that in some cases services are enabled once the system deduces the actual or intended operation is distant from the operator's station.

After acoustic returns are detected at steps S210, and S222 of FIG. 4, the RF output power is adjusted to the minimum workable value that still allows detection, thereby saving electrical power, and proximal electronic noise pollution.

Figure 5:
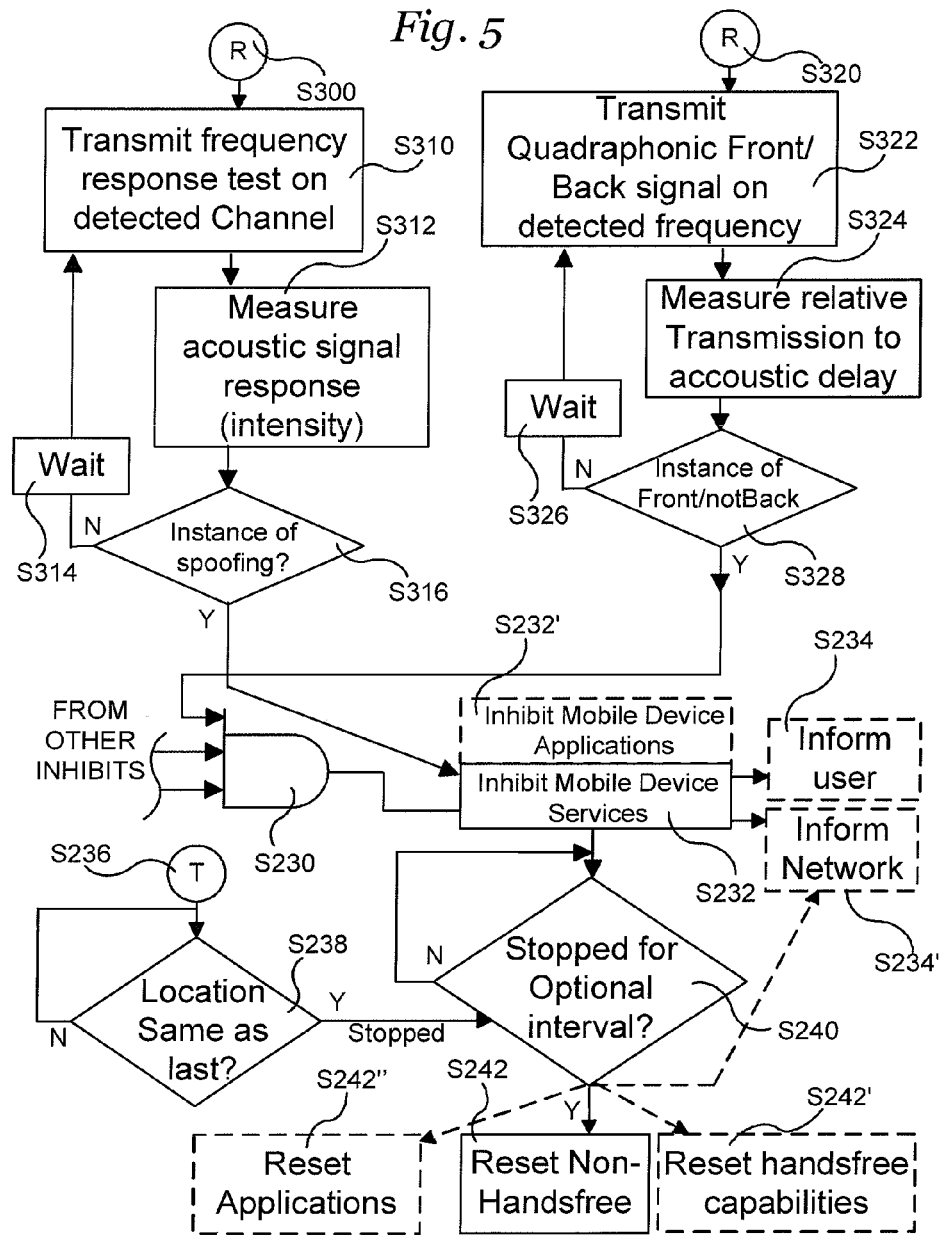
FIG. 5 is a control flow chart associated with the arrangement of FIG. 1, showing two optional ancillary branches for dealing with non-standard uses.

FIG. 5 shows two threads. The first thread, enabled via port R (step S300), is initiated on an ongoing basis. This thread uses the RF channel previously detected as selected by the vehicle operator/vehicle passenger or otherwise. This thread will transmit an RF signal modulated to provide a sweep in the audio frequency spectrum and then measuring the corresponding acoustic response, for the case of using vehicle speakers.

Although not labeled as such for clarity, step S312 also corrects the incoming acoustic signal for any channel improvement techniques, such as frequency compensation, companding or the like. For example, FM broadcast compensates audio frequencies above 2.1 KHz, by adjusting their amplitude. This effect must be removed, or otherwise taken into account. Succeeding step S316 compares the acoustic response to the expected, common frequency responses within ordinary vehicles, i.e. vehicles with common (larger format) speakers are discerned from headphones from a portable electronic device, to eliminate the possibility of a portable electronic FM or similar device being oriented and used to simulate the vehicle's built-in FM receiver. The assumption is that the frequency response of the portable electronic unit will have less lower frequency response, i.e. less bass. By measuring the bass response the spoofing attempt is uncovered at step S316, and the portable electronic device has services removed at previously described inhibiting steps S232 and S232', until a determination can be made that the device is no longer appears to be operating in a moving vehicle, at which time services, phone services, text capabilities, and application availabilities are restored at step S242, S242', 242" and S242''', as determined at previously described step S240.

After acoustic returns are detected at steps S310 and S322 of FIG. 5, the output power is adjusted to the minimum workable value, thereby saving electrical power, and proximal electronic noise pollution.

Steps S320, S322, S324, S326 and S328 correspond to previously mentioned steps S220, S222, S224, S226 and S228 of FIG. 4 but are adapted to handle a quadraphonic audio system. In particular the output of step S328 will be combined in step S230 with other inhibits, notably the right/left determination from steps S210, S212, S216, and S218 of FIG. 4 in order to inhibit or disable services if the portable device is located in the front left.

Figure 6:
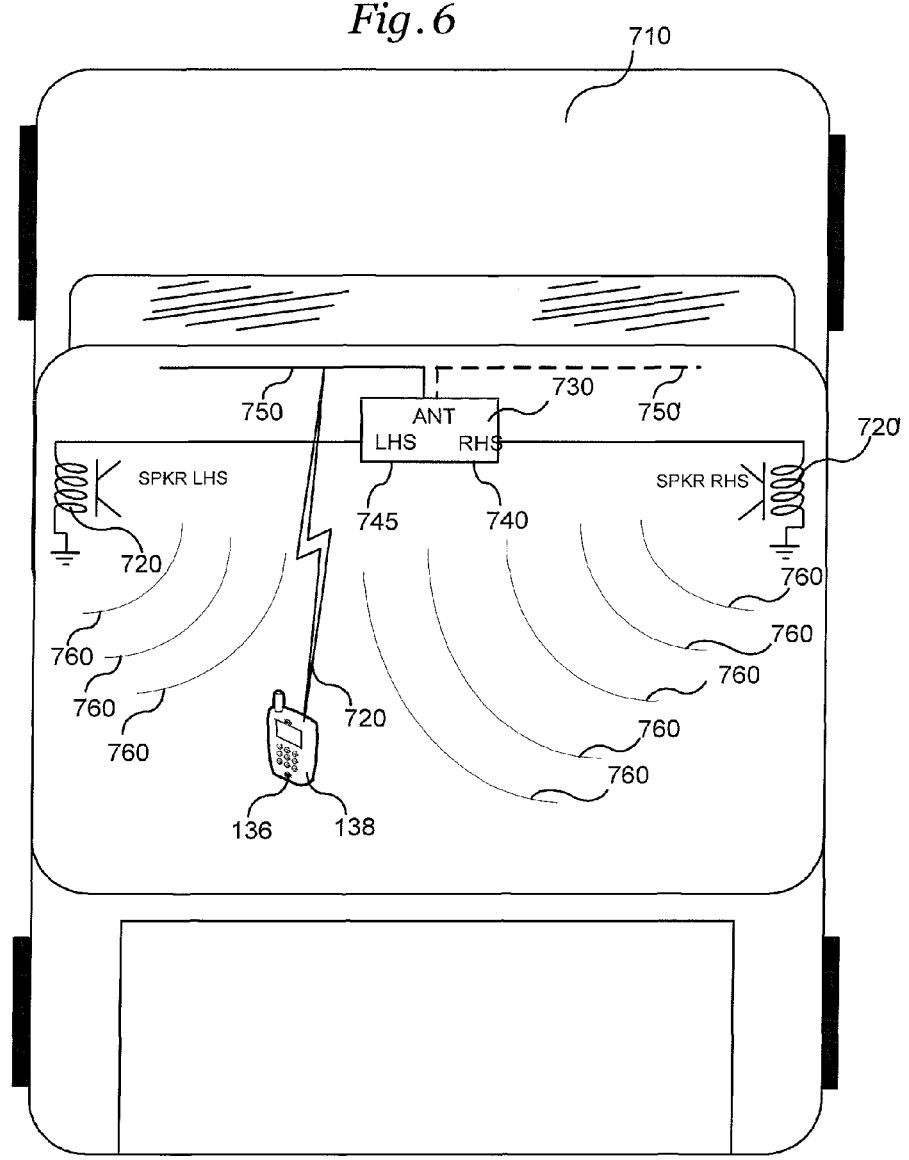
FIG. 6 is a schematic diagram showing an exemplary deployment of the foregoing apparatus in a vehicular environment.

Referring to FIG. 6, the in-vehicle stereo arrangement is shown with in-vehicle portable electronic device 138 suitably equipped with the arrangement of FIG. 1. Portable electronic device 138 is shown with acoustic transducer 136, and electronic wireless communication 720, communicating with antenna 750, a monopole, or optionally a dipole 750'. Radio 730 receives RF signals from antenna 750, splits the signal into different channels 740 and 745 and outputs them via audio transducers (speakers) 720 and 720' as acoustic waves 760. Thereafter, audio transducer 136 of portable electronic device 138 senses acoustic waves 760. In some embodiments the native transducer 136 of device 138 will not be used for the acoustic returns and will be supplanted by a dedicated transducer (e.g., transducer 144 of FIG. 1).

Figure 7:
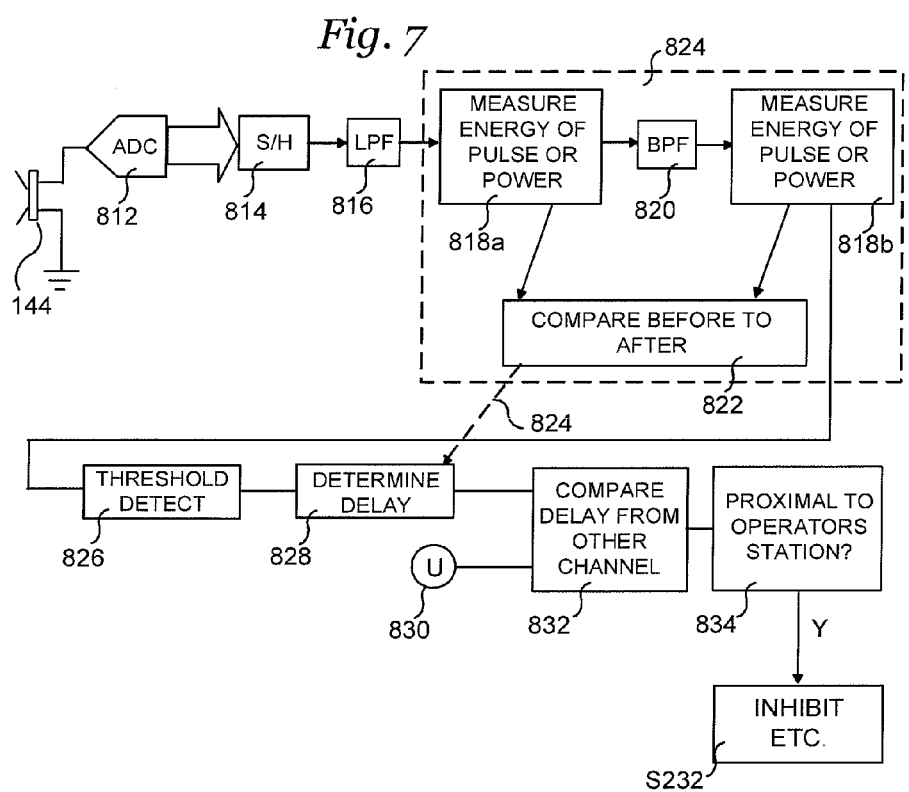
FIG. 7 is a schematic block diagram of a discriminator cooperating with the apparatus of FIG. 1 for processing a return acoustic signal.

Referring to the discriminator of FIG. 7, previously mentioned acoustic transducer 144 senses acoustic signal 760 from FIG. 6. With the exception of transducer 144, the balance of the system of FIG. 7 may be implemented in software running on processor 122 of FIG. 1. In other embodiments portions of this system may be implemented with hardware that may be mounted on the same circuit board holding accessory 148 as illustrated in FIG. 1.

The signal generated by transducer 144 is sent to analog to digital converter (ADC) 812, and converted into a digital sampled signal that is sent to sample and hold 814, which samples and holds the signal for low pass filtering by low pass filter (LPF) 816. The output of low pass filter 816 is sent to subsystem 824 containing among other things, bandpass filter 820.

Band pass filter (BPF) 820 is tuned to reject sound energy outside the audio range of interest containing the acoustic signal 760 (FIG. 6). For this reason, band pass filter 820 has both its input and output signals measured by measuring means 818a and 818b, respectively. Signal levels are compared at block 822. A relatively low signal from band pass filter 820 relative to its input, indicates that the received acoustic signal is not the test signal of interest, or that the signal to noise ratio is too low to be reliable. A poor comparison at block 822 sends an inhibit signal along link 824a to disable block 828, whose operation will be described presently.

Also, measuring means 818a operates as an analyzer to determine whether the bass audio content is consistent with an ordinary car sound system or is an attempt to spoof using a handheld audio device as described previously for step S316 of FIG. 5. If spoofing is detected any determination on device location that might be otherwise made by the discriminator will be nullified.

The output signal 824 will be enhanced by threshold detector 826, which will block weak signals but pass strong signals that rise above background noise, thereby separating the pertinent signal from potential background noise.

The delay between the RF test signal and the sensed acoustic delay are measured at delay determining element 828. For example, a timer (hardware or software) consisting of a system clock and counter that is started when processor 122 (FIG. 1) first transmits a test signal, i.e. first produces an output on terminals OUT L, OUT R, and OUTUE. The arrival of the acoustic return at element 828 stops the timer (its counter).

The delay determination of element 828 may be performed in other ways. In one embodiment a replica of the audio signal transmitted in the RF test signal is stored in memory 124. This replica can be played back after a preprogrammed delay and then correlated with the audio response. The delay of the replica is adjusted until a maximum correlation is achieved. This correlation is performed on both the left and right channel, that is with the distinct pair of audio responses. Once the magnitude of the respective delays is determined, the system can achieve higher resolution by then examining the phase difference between the delayed replica and the returning audio response.

Assuming element 828 has just determined the delay for the first channel (here the left channel), this first delay value is stored at block 832, which then awaits the delay value for the second (right) channel. In the manner just described, delay determining device 828 measures the delay between transmission of the RF test signal and the return of the acoustic signal. Block 832 can now compare the delays of the right and left channel.

In some embodiments the right and left channels are simultaneously stimulated and acoustic signals are transmitted at the same time. In that case a comparison can be directly made between the two channels: The first channel to respond is noted as well as the size of the delay before the other channel responds. Simultaneous transmission requires an independent detection channel, whose output is conveyed through portal U (input 830).

The relative delays are evaluated at step 834, which can be an evaluation performed in software (e.g. in processor 122 of FIG. 1 or in another processor). In fact, upon digitization at converter 812, the rest of the processing may be performed in software.

Ascertainment of whether the delays signify reception at a location proximal to the operator's (driver's) station is done at step 834. As described before, the right/left determination can be made independently of the front/back determination. Alternatively, a simple right/left pair of test signals may produce different return delays indicating a right or left location, while their average (or the maximum) can indicate a front or back location. In still, other embodiments, the magnitudes of the right and the left delays can be correlated to azimuth, with a hard left angle indicating reception at the operator's (driver's) seat.

Proximity to the operator's station can impose on the portable electronic device inhibits, disables, enables, or commands with combinations of each. In other embodiments, this results in network flags, configuration of the arrangement for enhanced operations or combinations of both.

Figure 8:
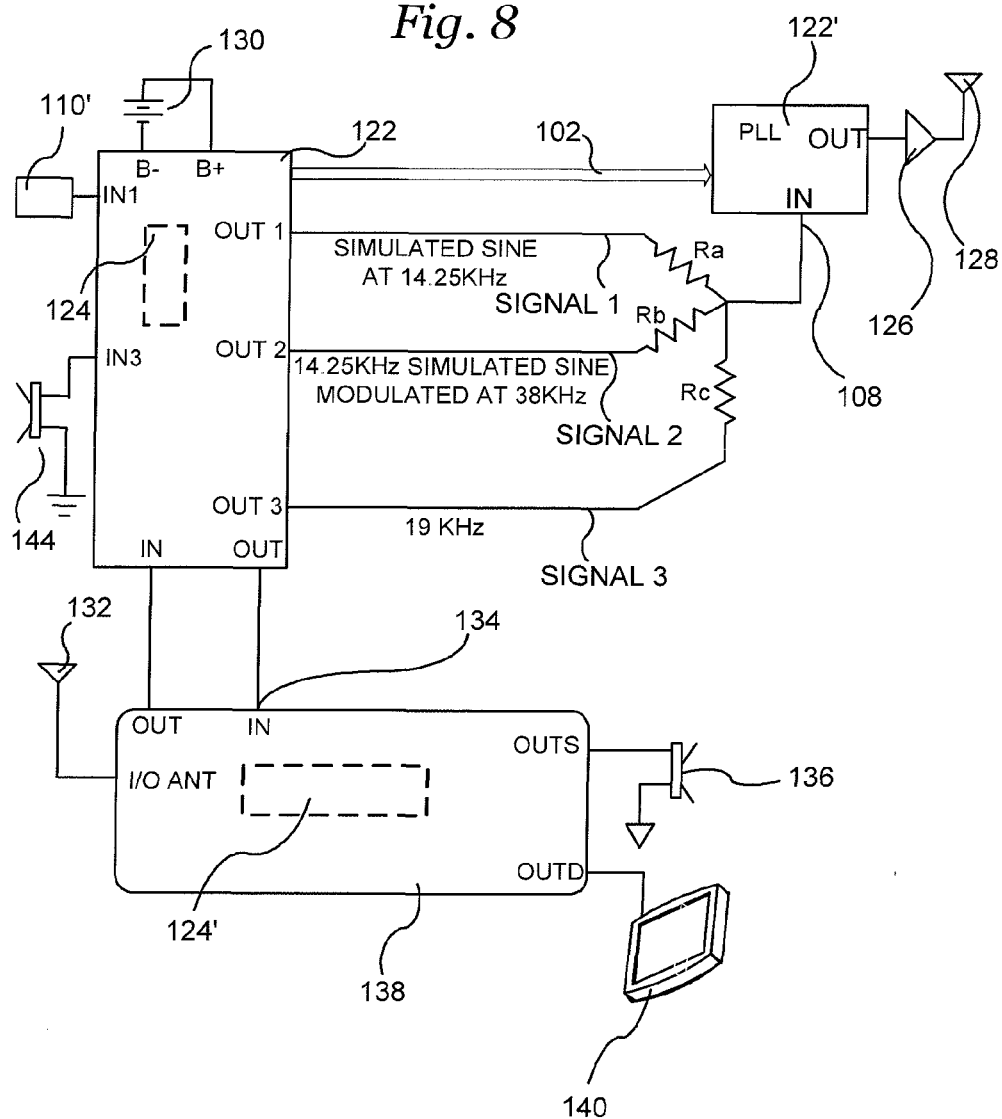
FIG. 8 is schematic block diagram of apparatus that is an alternate to that of FIG. 1 and is suitable for production of a transmitted RF test signal, with reduced component count.

FIG. 8, an alternate to that of FIG. 1, indicates an arrangement wherein the left side signal and right side signal are simulated. Processor 122 is the same hardware as before, but programmed differently. Signal OUT 1 (second audio signal) from processor 122 is a simulated sinusoidal signal at 14.25 KHz. Signal OUT 2 (first audio signal on a subcarrier) is a signal comprising the same 14.25 KHz signal modulated by 38 KHz. Instead of replacing the prior multiplier (multiplied signals at 38 kHz and 14.25 kHz) with processing intensive multiplication, the processor can use simple addition by invoking the following trigonometric identity:

$$\cos a \cos b = \tfrac{1}{2}[\cos(a-b)+\cos(a+b)]$$

Thus a composite signal achieves multiplication by the addition of two signals, (i.e., the cos(a−b) and the cos(a+b) signals, namely, a 23.75 KHz and 52.25 KHz signal at half intensity). This is the equivalent of multiplying the cos a and cos b signal, or the 14.25 KHz and 38 KHz. Both 'signal OUT 1' and 'signal OUT 2' are added to the summing node via Ra and Rb respectively.

An additional 19 KHz pilot tone, signal OUT 3, is added to the summing node via resistor Rc. In this embodiment, the signals OUT 1, OUT 2, and OUT 3 from processor 122 have the same frequency content as those required for frequency modulation of the nominal center frequency from the PLL 122'. Thus the signal at node Ra/Rb/Rc produced by this summing circuit is essentially the same as that at node R4/R5/R6 of FIG. 1. Accordingly, the same FM signal can be transmitted through amplifier 126 and antenna 128 by phase locked loop 122' (essentially the same as PLL 122' of FIG. 1). An optional image rejection filter is not shown for clarity.

FIG. 8b indicates signal characteristics applicable to this and other embodiments. The OUT 1 signal is shown as a pulse width modulated (PWM) signal modulated at 14.25 kHz to obtain a sinusoidal-like signal. For FIG. 8 signal OUT 1 is considered the left plus right channel (L+R). In contrast, for FIG. 1 signal OUT 1 is considered the left channel while the right channel (signal OUT 2) will be essentially the same, except for possibly different start times, encoding, etc.

In any event signal OUT 1 differs from the ideal 14.25 KHz in that it represents a piecewise monotonic signal indicative of the 14.25 KHz signal. However, such a signal is relatively simple to produce from a digital processor. A capacitor, (not shown for clarity) is in series with the output and serves to reduce the digitization noise on the output. This signal is then output to the summing node as described above (e.g., node Ra/Rb/Rc of FIG. 8).

Immediately below signal OUT 1 of FIG. 8b are four more signals illustrating production of the left minus right signal (L−R), modulated by 38 KHz. The second signal, marked "in phase," represents a signal useful for modulating a 38 kHz base band in order to produce a response in the left channel only. Basically the first signal OUT 1 represents a sum signal (L+R) and the second "in phase" signal represents a difference signal (L−R). Since the L+R signal and the L−R signal are the same, an FM radio will decode this as a pure left signal.

The third signal, marked "shifted 180 degrees," represents a signal useful for modulating a 38 kHz base band in order to produce a response in the right channel only. Again the first signal OUT 1 represents a sum signal (L+R) while the third "shifted 180 degrees" signal represents a difference signal (L−R). "Shifted 180 degrees" means the inverse (negative) of the first signal OUT 1. Since the L+R signal and the L−R signal are inverses, an FM radio will decode this as a pure right signal.

It will be appreciated that a digital processor can readily fabricate these first three signal using pulse width modulation as indicated. The processor can likewise produce the fourth signal, representing a 38 kHz tone. Using either the second or third signal ("in phase" or "shifted 180 degrees"), a discrete modulator (e.g. modulator 106 of FIG. 1) can produce the double sideband, suppressed carrier that is the standard in commercial FM broadcasts. The latter can be summed with the first signal (OUT 1) and the last, a 19 kHz pilot tone, and this sum can modulate an FM carrier in the usual fashion.

Instead of applying the second or third signal ("in phase" or "shifted 180 degrees") to a discrete modulator, a modulated signal can be produced directly by a processor. Thus, in FIG. 8 signal OUT 2 will be a double sideband, suppressed carrier modulated at 14.25 kHz, as described above. This modulated signal will be constructed using the previously described pulse width modulation technique. Thereafter the sum signal OUT1, the modulated difference signal OUT 2, and the 19 kHz pilot tone OUT 3 will be summed by resistors Ra, Rb and Rc, respectively, and the sum used to modulate previously described phase locked loop 122'. The resulting FM signal will be transmitted through amplifier 126 and antenna 128.

The embodiment of FIG. 9 is similar to the arrangement of FIG. 8, except the composite is output from the processor 122 and applied directly to the phase locked loop 122', which then transmits the FM signal through amplifying means 126 and radiating means, antenna 128.

In FIG. 9 output OUT 1 of processor 122 is completely constructed, prior to application to phase locked loop 122'. For this embodiment, the result of the combination of the five signals of FIG. 8b, is determined a priori, stored in memory

124, and merely output as the playback of a composite signal stored in memory 124 of processor 122. A priori adjustment of the relative values of the signal components, i.e., the 19 KHz, the 14.25 KHz, and the 38 KHz is such that the modulator 122' of FIG. 9 has appropriate inputs to simulate the right side signal, the left side signal, or the interrogation signal used to make the determination of frequency response.

In the embodiment of FIG. 10 processor 122 is sufficiently rapid to simulate the RF signal directly. The signal of the processing means 122 of FIG. 10, is further multiplied by the appropriate carrier frequency prior to being output to amplifier 126 and antenna 128. Again, the signal multiplication is done by the summation of the sum and difference signals, as described earlier. In this case, however, it is the RF center frequency that is used and the composite modulation that is the other signal, which is in this case added. This mathematical manipulation is done a priori to simulate essentially a left, a right, or sweeping signal. It has appropriate bandwidth representative of a composite modulated signal such as that of FIG. 1, or 8.

In some cases an optional series capacitance is required at the output of OUT 1 before leading to amplifier 126. The modulation of this case and that of alternate embodiments which have only the amplifier, or in some alternate embodiments only the antenna, is similar in that it simulates the FM signal, but different in that instead of driving the modulator with a modulation signal, the output signal is already modulated mathematically and merely output to the amplifier/antenna combination, or output to the antenna.

Figure 10B:
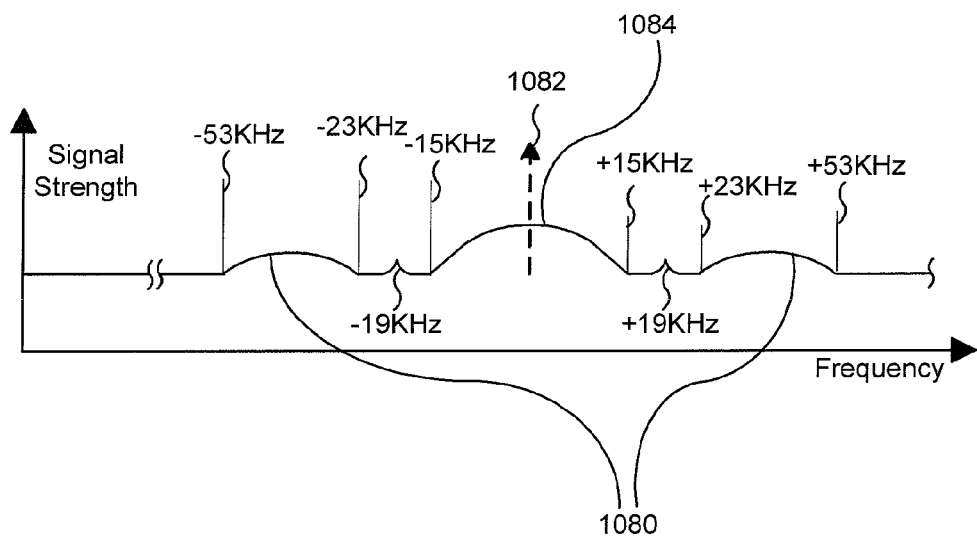
FIG. 10b is a the spectrum of a conventional FM stereo channel.

FIG. 10b shows an exemplary FM modulation scheme. Sidebands, 1080, are shown in two places and are essentially placed from 23 KHz to 53 KHz on either side of the nominal centre frequency, 1082. Nominal centre frequency is shown as a dashed line as it is typically not present, except in cases of no instantaneous modulation. Centre modulated signal, 1084, is shown to be within essentially 15 KHz of either side of the nominal centre frequency, 1082. Pilot tone is shown as 19 KHz, and is located between the main modulated signal, 1084, and the sidebands, 1080.

Figure 10C:
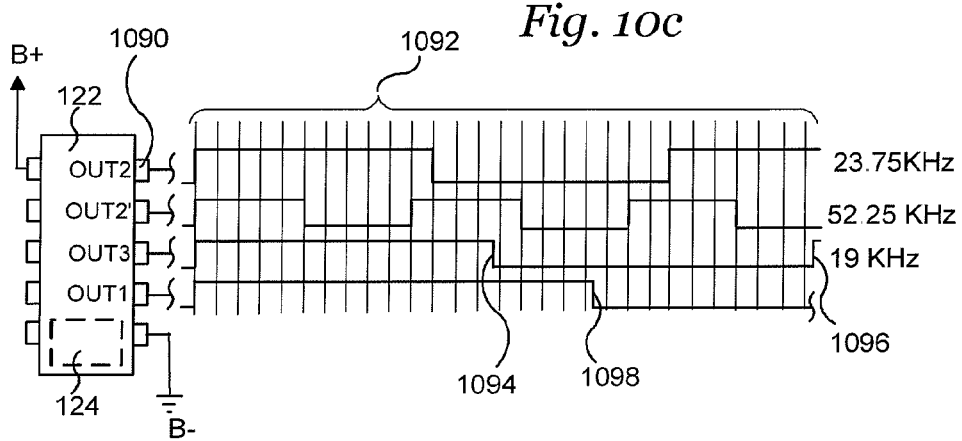
FIG. 10c microprocessor arrangement for outputting the required audio frequency signals.

The arrangement of FIG. 8, an alternate to those of FIG. 1, shows an arrangement, wherein a frequency synthesized local oscillator is additionally modulated by signals output on three separate pins of the processor means, 122, of FIG. 1. Referring to FIGS. 8, and 10c, there is shown an arrangement for generating the required signals from a common general purpose embedded processing element. During the testing phase RF signal is generated to drive the left and right side speakers, with signals of different characteristics. In one embodiment, the signal is reduced slightly from the 15 KHz test signals to those of 14.25 KHz. In this embodiment, outputs, OUT1, OUT2, OUT 2', and OUT3, have transitions essentially at the major time divisions, 1092. This is perhaps related to processor clock cycles. It is to be noted that Output OUT2, is able to output signal that transitions at a 23.75 KHz repetition rate, if a 261.25 KHz clock rate were to be used, and OUT2 was programmed to transition every eleventh clock cycle. Additionally a 52.25 KHz could be generated for the same clock rate if transitions on OUT 2, are programmed to occur every fifth clock cycle.

The output of these two signals, by connection to add to the signals already commanding the VCO to set the local oscillator frequency, will output the equivalent of the sidebands, 1080, of FIG. 10b.

Output OUT3 is programmed to transition every 13.75 clock transitions generating a pilot signal of 19 KHz.

Another description would be that a clock transitioning at four times the nominal 261.25 KHz, or 1.045 MHz, and OUT3 programmed to transition every 55 (=13.75×4) clocks output a 19 KHz pilot signal that is also added into the VCO control signal.

Output OUT1 is programmed to transition every 18.3333 clock transitions generating a signal, to be used in the generation of the left and right side signals of 14.25 KHz.

The more elegant description is that a clock transitioning at three times the nominal 1.045 MHz, and OUT1 programmed to transition every 55 (=18.33333×3) clocks outputs a 14.25 KHz pilot signal that is also added into the VCO control signal.

The signal generation of these last two outputs, uses the major clock transitions of FIG. 10c, and the minor clock cycles occur twelve times as frequently. In this case (accommodating the generation of the 14.25 KHz signal), OUT1 is programmed to transition every 220th transition of the now 12 times over, 3.135 MHz main clock to output the 14.25 KHz signal.

OUT3 is programmed to transition every 165th transition of the now 12 times over, 3.135 MHz main clock's to output the 19 KHz signal.

OUT2 is programmed to transition every 132nd transition of the now 12 times over, 3.135 MHz main clock's to output the 23.75 KHz signal.

OUT2' is programmed to transition every 60th transition of the now 12 times over, 3.135 MHz main clock's to output the 52.25 KHz signal.

Using this clock scheme negates the need for a very fast clock to ensure that the appropriate signals are output in the pass-band.

The rectangular waves shown in FIG. 10c are passed through a capacitor, to remove the even harmonics of the signals being generated. Additionally the third harmonics generated by such arrangement is greatly reduced in power to only one third, and in all cases, will fall outside the pass-band.

[The 14.25 KHz case has pass-band limited by a 15 KHz RC filter as is known in the industry. The 38 KHz modulated 14.25 KHz has third harmonics of the 23.75 KHz, and 52.25 KHz signals fall above the 53 KHz cutoff of the same style low pass filter. The third harmonic of the 19 KHz signal also falls beyond the pass-band cutoff frequency, of essentially 53 KHz.]

Controlling the 14.25 KHz signal used in the mix of OUT2, and its positive or negative to be used by OUT1 permits exclusively the left or right side speakers of the FM receiver to be driven.

Figure 11:
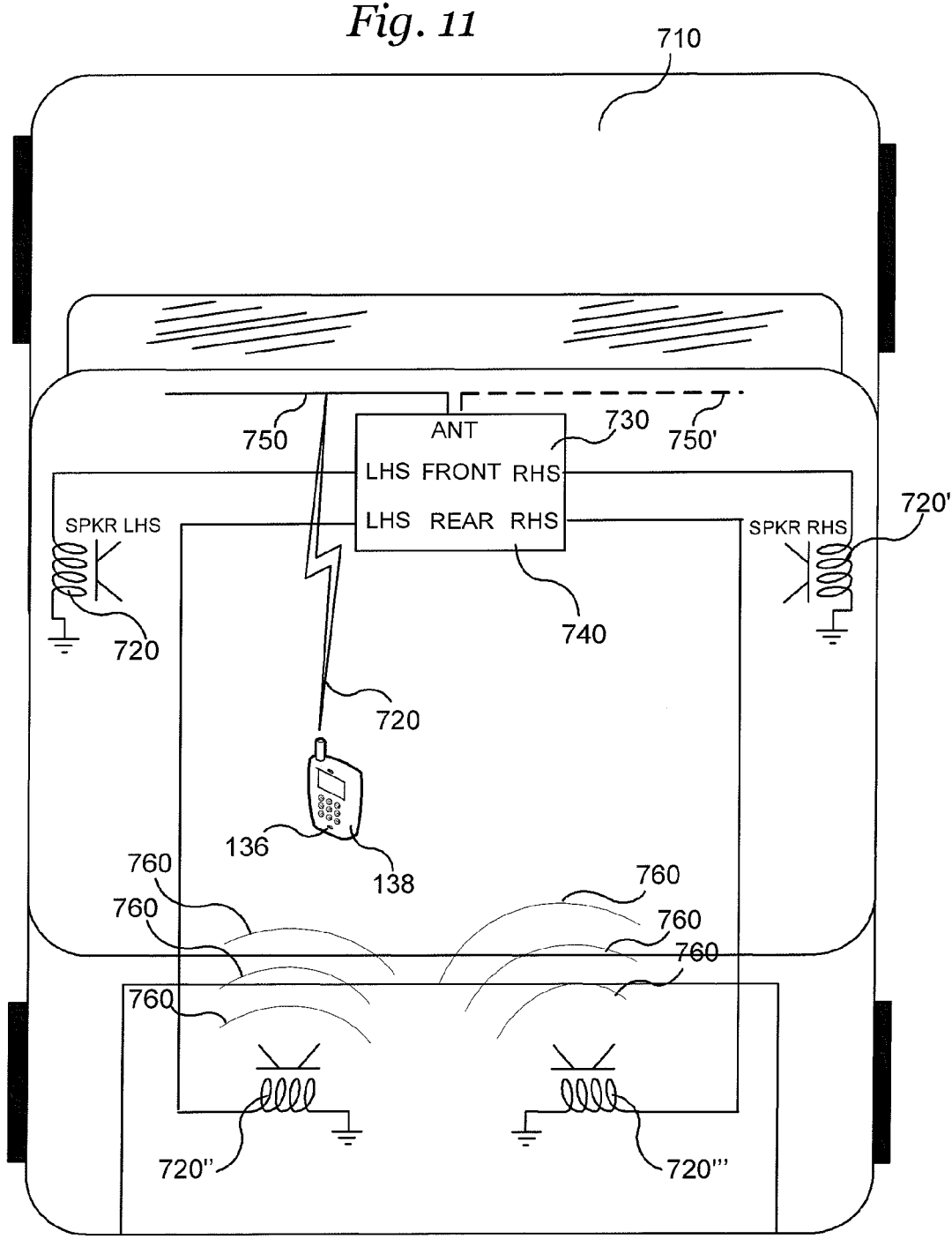
FIG. 11 is a schematic diagram showing an exemplary deployment of the foregoing apparatus in a vehicular environment that is an alternate to the environment of FIG. 6.

Referring to FIG. 11, a quadraphonic arrangement is shown in vehicle 710 outfitted with rear speakers, 720" and 720'''. Determinations of left/right are made as before. Determinations of fore/aft however are made using the return time of four electronic signals, sequentially transmitted to each of the quadraphonic speaker locations and their respective acoustic returns. Locations in the vehicle rear are deduced by filtering for short return delays associated with the rear speaker outputs. Locations in the vehicle front are deduced by filtering for the short return delays that are associated with the outputs to the forward speakers. It is understood that any of the quadraphonic or fade channel configurations are to be simulated by suitable means at any of the previous output combinations, wherein the outputs of FIG. 1 exploit four contributory outputs representative of the principal four channel locations, i.e., front left, front right, rear left and rear right, the composites thereof, or any suitable combination.

Figure 11C:
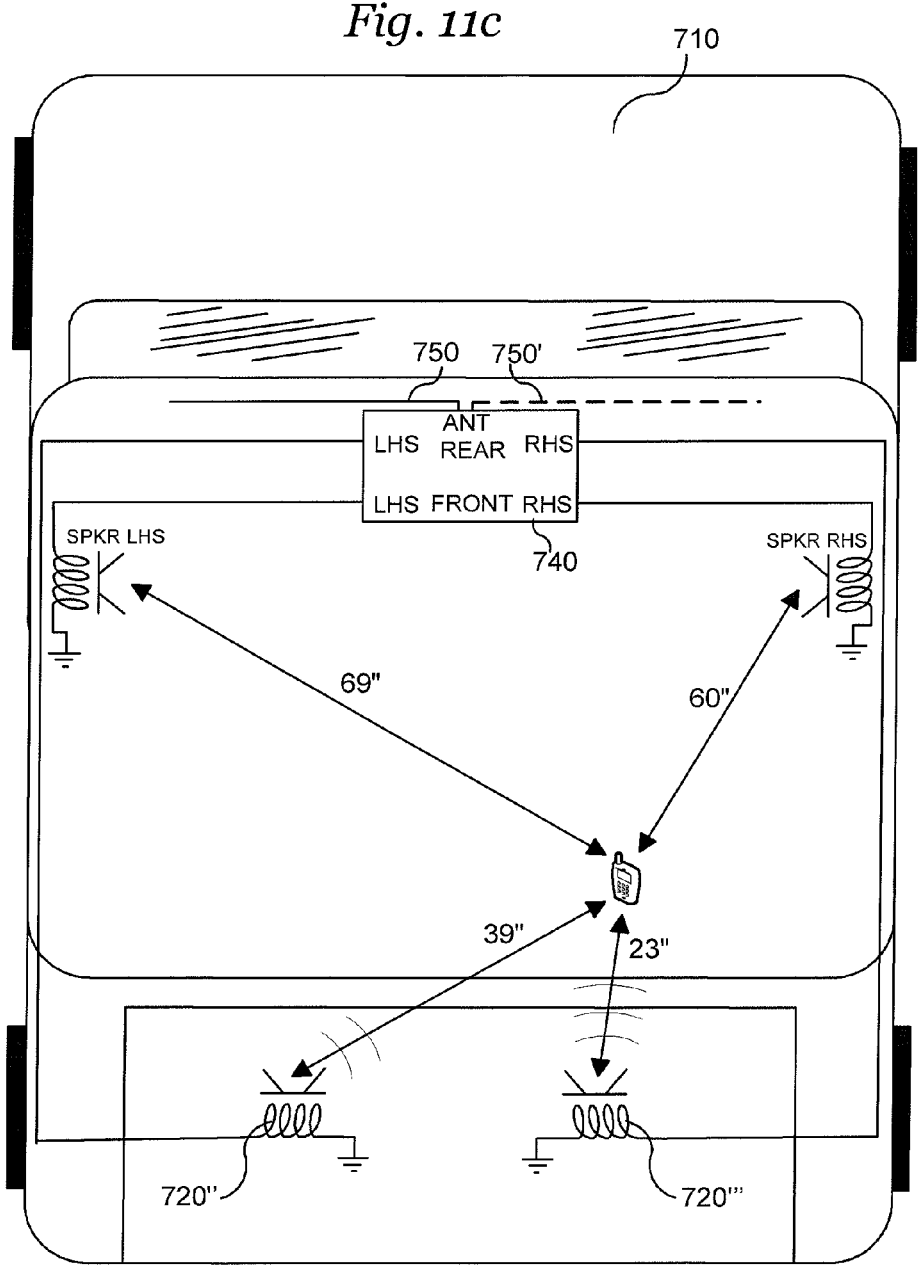
FIG. 11c is a schematic diagram showing a placement of the portable electronic device in a location different from that of FIG. 11b.

FIG. 11b shows an example of measured speaker to user distances for a front seat case. FIG. 11c shows an example of measured speaker to user distances for a rear seat case.

These spatial values of speaker to user are expected to vary from vehicle to vehicle. It is to be noted that due to the distances between the front speakers (measured to be 56 inches in the example case, and supplemented with on-dash speakers that were 51 inches apart), are much greater than those of the rear speakers, typically placed on the rear deck. An additional consideration is rear speakers usually contribute bass and are therefore commonly large sized. This aspect usually puts the center of the speakers closer together and closer to rear users.

Use of this arrangement of the suitably equipped portable electronic device permits detection based on a hyperboloid. If the portable electronic device is located halfway between the two (front) speakers the detection is that both left-only and right-only signals take a like time to arrive. If the unit is placed closer to one or the other, the time to arrive is reduced for that speaker and increased for the other. Either the absolute amount of time from the speaker to the portable electronic device, or the time from the closest speaker relative to the other-side speaker to the portable electronic device indicates the location of the user. It is to be noted that as both distances increase the user may be in the rear of the vehicle. It is also to be noted that in some cases the inquisitive user will attempt to locate in the vehicle front, and trick the mechanism by setting the stereo to the full rear fade setting, without any front sound intensity.

In some embodiments of the arrangement, there is a detector that determines the difference in the speaker to portable electronic device microphone time delays, as is described earlier. In such cases delays that are not sufficiently different, in this example 6 inches, are rejected as being a case of being in the front seat and trying to spoof the system. This implies two small costs: the legitimate user in the front passenger's seat location is unable to use a portable electronic device in the center area between the two front seats if the difference between the two front speakers is less than this threshold of the order of 6 to 10 inches, and in some cases, the legitimate back seat user may have to have the stereo set to full front fade to avoid the case of a too small left to right delay (user is too far from rear speakers or they are too close together) and a too small overall delay (i.e. system thinks that legitimate user is in the front).

It is to be noted that in this real world example, a legitimate front seat user is unable to use the portable electronic device in all cases.

Figure 12:
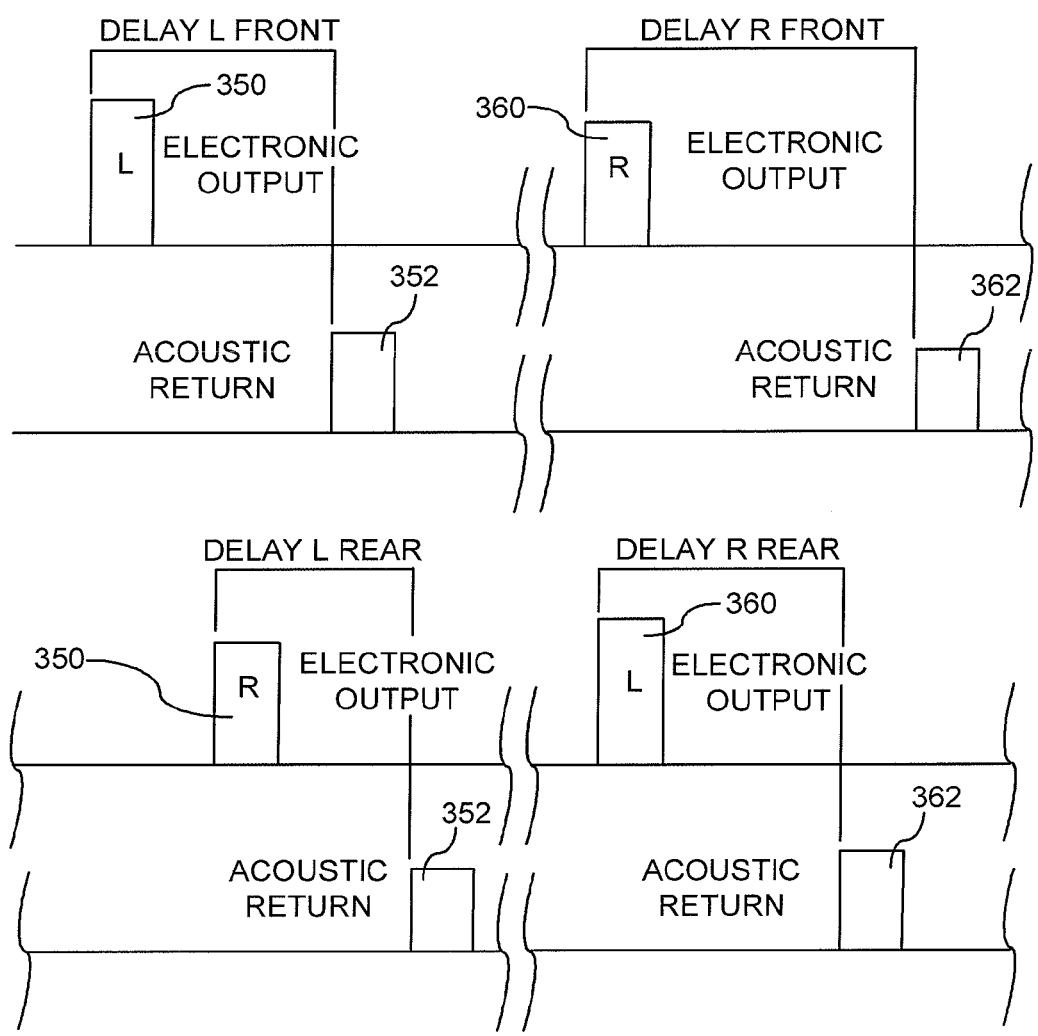
FIG. 12 is a representation of output signals that are produced in the embodiment of FIG. 11, as well as exemplary signals that are returned in response thereto.

In FIG. 12 an additional thread enabled by portal R (step S320 of FIG. 5), is initiated on an ongoing basis. This ongoing thread commands simulated quadraphonic signals, as transmitted over the air, to the receiver. This signal is transmitted on the channel sensed, by the lack of signal, by the presence of a signal, or by modulation.

In other embodiments these techniques are used in overlapping fashion, where more than individual signals are used. In still other embodiments other techniques are used in conjunction with these techniques. In still other techniques these techniques are applied to stereo speaker arrangements.

An audio signal at 14.25 KHz offers a good compromise between a signal that is high enough in frequency to not be heard loudly, and a wavelength giving reasonable resolution of distance from a given speaker, as well as delivering a signal slightly below the maximum allowable frequency (i.e. below the system maximum of 15 KHz), such that a convenient method of generating a signal at that frequency exists, for a standard microprocessor.

While 14.25 kHz is described herein, other embodiments will employ different frequencies. Since audio at the upper end of human hearing is advantageous, most embodiments will employ in the right and left channel an audio frequency (or frequencies) in the upper octave of human hearing (defined for the purposes of this specification as the range of 8 kHz to 16 kHz). For practical limitations associated with standard FM broadcast signals, the frequency will often be in the range of 14 kHz to 15 kHz.

This 14.25 kHz frequency mentioned above provides an efficient method of outputting multiple sinusoidal signals, i.e., the frequency 14.25 KHz when mixed with 38 KHz, generates two signals that are sub-harmonically related, and the entire sequence will repeat after a very short time due to their exact ratio of 5:11. Thus for arrangements that output from a memory this permits use of relatively small memory space.

As the wavelength equals v (velocity of sound) divided by f (frequency) it is advantageous to use higher frequencies to obtain the higher resolution of shorter wavelengths. It is also true that vehicular noises tend to be low frequencies, engine speeds of one to three thousand RPM is quite low in frequency. Road noise, generated by tire turns, is on the order of 30 Hz at highway speeds. Therefore, a test signal close to the maximum of 15 kHz would be advantageous.

Other frequencies that need to be generated include 38 KHz, and 19 KHz. Ideally, one would like to generate 14.25, 19, 38, 23.75, and 52.25 KHz. One approach would be to employ a clock frequency that is the product of those five frequencies, i.e. a clock frequency of: 12498598 KHz. That frequency could be (a) divided by 19K, 38K, 23.75K, 52.25K to get 14.25, (b) divided by 14.25K, 38K, 23.75K, by 52.25K to get 19 KHz, and so on. But 12498598 KHz is 12.498 GHz, which is difficult to handle with ordinary processors.

By using an audio signal of 14.25 instead of 15 KHz, certain efficiencies arise. 52.25/19 gives us: 2.75 and therefore 52.25×4 easily gives us 19 KHz, or 52.25×12 easily gives us both 14.25K and 19K, and because 19 goes evenly into 38K one could also get 38K without any real effort. One would have 52.25 already.

Going back to the possibility of using 14.25K we can use this in a very small multiple and generate all of the frequencies that we may need; i.e. 52.25/23.75, the last value works out to a factor of 2.2, and therefore we need an additional factor of 5. 5 doesn't go evenly into 12, and so we must multiply it by 12. That means that we must multiply 52.25 by 12×5 to get our main clock, which is very much less than the earlier value of 12 GHz.

So we can now take each of our values and divide them by what ever is required from the 52.25 KHz×60 (3135 kHz) and expect to exactly make each of the required values. Specifically:

3135 kHz/220 gives 14.25 KHz
3135 kHz/165 gives 19 KHz
3135 kHz/132 gives 23.75 KHz
3135 kHz/82.5 gives 38 KHz
3135 kHz/60 gives 52.25 KHz If the CPU clock is adjusted to 3.135 MHz and an output pin is divided by six to produce 522.5 kHz, then one can easily generate 52.25 KHz. Using this frequency one could output 5 'ones' in a row followed by 5 'zeros' in a row and then 5 'ones' and then 5 'zeros' and so on and so on to produce a frequency of 52.25 kHz. For the other case of 23.75 KHz one can merely output 11 'ones' in a row and then 11 'zeros' and then 11 'ones' and then 11 'zeros' and so on. The foregoing can easily be produced on adjacent pins say data bits 1 and 2, or 2 and 3 of the processor. By doing this we can eliminate the mixing function required, because we now generate the sum and difference frequencies required for the OUT2 of FIG. 8*b*, but we also are able to generate on other data pin outputs from the same clock of 19 kHz. So in short there is great convenience in using 3135 KHz (i.e. 3.135 MHz) or 2×, or 3×, or 4×(small multiples) of 3.135 MHz.

The transmission arrangement, essentially located on printed circuit board (PCB) in accessory 148 commonly, but not restricted to being, a Frequency Modulation (FM) transmitter can be a satellite radio, e.g., X-modulation (XM) radio, Sirius radio. In other embodiments it is one of an Analog Modulation (AM) transmitter, a Quadrature Phase Modulated (QPSK) transmitter, a Bi-phase modulated (BPSK) transmitter, a Quadrature-Amplitude (QAM) transmitter, or other type of modulation of the transmitter. This is accomplished by substitution of the alternate modulator for the modulation element 122' of FIGS. 1, 8, 9. The modulators in this case exploit the same PLL as shown in FIG. 1, and FIG. 8.

By exploiting the very low RF to audio latency required of FM to ensure coherency between left and right channels, and to ensure coherency between front and rear channels, when equipped, the present disclosure is able to resolve operation proximal to the operator's station.

By sensing the time taken from the transmitted RF by FM transmitter of accessory 148, until the returned acoustic signal an indication of the fore/aft position in the vehicle is detected. Slower returns are indicative of a longer path length and therefore deduced to be from the back seat. This is detected in software and permits portable electronic device use. An exception to this includes the software test routine that samples the returning acoustic signal from the left and right sides in such (deduced rear seat locations) further examines the difference in left to right side differences of the returning acoustic signal wherein the left to right side differences less than a threshold value are assumed to be coming only from rear speakers, 720" and 720''' of FIG. 11, which are closer together, and therefore are deduced to be the operator in the front, with the fade control sufficiently aft as to overcome the signal otherwise emitted from the front speaker pair. For Fade settings other than this, i.e., normal fade or fade favoring forward speakers, emission from the front speaker pair passes this test and is not disabled, unless for other reasons.

It is understood that left/right balance control settings that disable reasonable return signal strengths from either side disables the device and causes shutdown or a change in the service profile of the device. In most embodiments the device removes services such as phone response, phone dial, phone number retrieval, texting, application initiation etc., or the necessity or having hands-free capability to continue in the call. It is understood that any of the phone disable functions can also equally be applied to smart phones, tablets, the texting function, laptops etc.

Heavy transmitter use at higher power levels, such as those of Bluetooth, place an additional unwarranted burden on the portable power supply of portable electronic devices. It is further understood that in some embodiments once the round trip relationship between RF signal output and acoustic input is established that the RF signal characteristics for high volume may be adjusted to diminish the modulation to just above a threshold adequate to maintain the control loop, but not significantly more. The generation of RF is commonly a proportionally higher user of incoming power use, consequently this arrangement is very efficient in portable devices.

The present disclosure further inhibits texting while only in the operator's station, of a motorized vehicle. The present disclosure inhibits applications, while the device is located proximal to the operator's station.

The present disclosure ensures that the additional power consumption by a portable electronic device transmitting occurs only for recent, at least partially sustained, accelerations, indicative of a vehicle in motion above a threshold, through use of detection from acceleration sensor 110 of FIG. 1 (or the EMF sensor, acoustic sensor, or any combination thereof), to determine times corresponding to use, attempted use, corresponding to the potentially dangerous condition of driving while texting, from step S100 of FIG. 3, driving while phoning, driving while adjusting a portable electronic device application execution profile, or combinations thereof, and changes the availability of such services, or informs a server, network, user, or combination thereof, at steps S232, S232', S234, and S234' of FIGS. 4 and 5.

The present disclosure permits very low power transmission. Some embodiments of the present disclosure exploit a profile, adjustable in FM modulation index to permit the minimum RF signal strength at which the electronic/acoustic control loop is established and maintained, thereby further saving power and optimizing the avoidance of RF signal spillage beyond the immediate vehicle. Moreover, power can be adjusted to the minimum needed in various ways, for example, by adjusting duty cycle, or by other means.

By placing a portable device player with headphones arranged to have the left one further than the right (for North American cases, it is opposite in some jurisdictions, i.e. Britain, South Africa, etc.) other devices are easily spoofed into thinking that operation is taking place at other than the operators location. This can be easily achieved by placing the ear phones on left for right and then using the portable electronic device on one side of the body or other, while at the wheel. In either case, spoofing is easily achieved with other systems by arranging portable devices in left for right and right for left contra-arrangement simulating non-operator side operation and thereby avoiding the inhibits otherwise applied.

FM systems exploit a system of signal intensity roll-on with frequency whereby the higher frequencies are increased in intensity to overcome the background noise. Embodiments of the present disclosure implement acoustic domain anti-spoofing by at least partially sensing acoustic domain frequency performance for pre-distorted RF signals transmitted. The pre-distortion corresponds to the FM frequency roll-off designed into FM receivers, to enhance the higher frequency performance versus the corresponding background noise.

The most common electronics configuration in vehicles today is one with FM stereo receivers. Bluetooth speakers, although not unheard of remain uncommon. In some embodiments, the present disclosure permits for satellite radio, AM radio, other radio system, or combination thereof.

Figure 13:
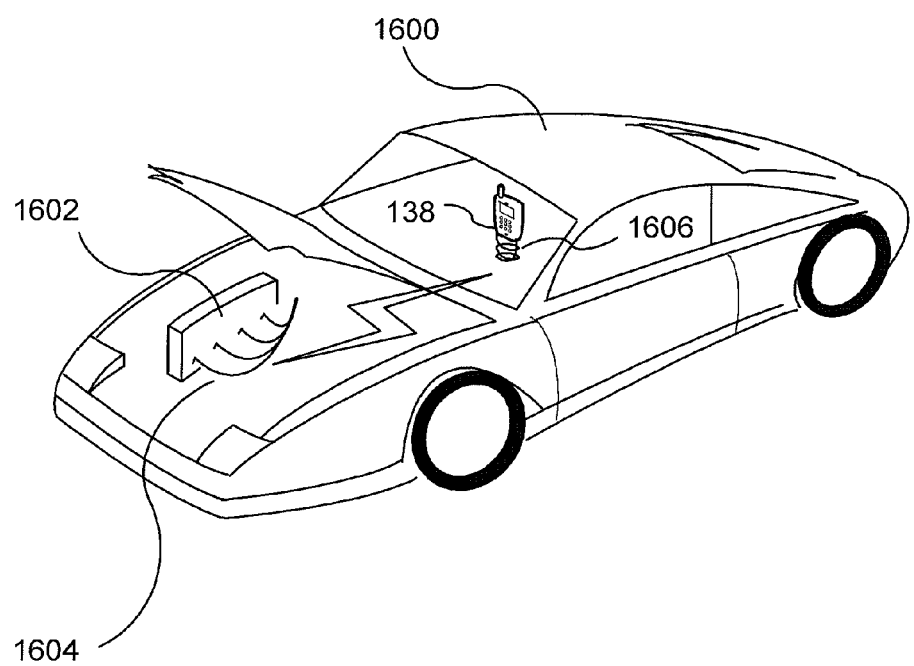
FIG. 13 is a perspective view of a portable electronic device with added coil, being carried in a vehicle that is shown with an engine and spark plug wiring.

In FIG. 13 portable electronic device 138 with added coil 1606 is carried in vehicle 1600, shown with engine 1602, spark plug wiring 1604.

The coil 1606 of FIG. 13 is a plurality of turns of arbitrary orientation. Sparkplug wires 1604 have changing current in them, and by Ampere's law they will have changing magnetic fields associated therewith. Although attempts to attenuate the transitions in the current in these wires has been done, these magnetic fields will nevertheless transmit over short distances, such as within the car compartment. The plurality of turns 1606 (shown externally for clarity) associated with the portable electronic device 138 will generate an induced voltage in accordance with Faraday's law. As the coil wire has impedance, the ends of the coil wire will show a voltage. This voltage will be optionally amplified and sensed as described later in the disclosure.

FIG. 13b shows a control flow chart showing the steps executed after a keystroke is detected on portable device 138. (It can be too costly to power consumption, to have the power running all of the time on, for example, an accelerometer or GPS, that could be used as a triggering device, etc.) The flow chart pertains to the hardware of FIG. 13d, and is an alternative to item 110 of FIG. 1.

At Step S1602 the portable electronic device detects a keystroke, for example a keystroke indicating a user is beginning to use the portable electronic device. The detection in a vehicle, moving or otherwise, activates a trigger sensor, i.e. a sensor that is an alternate to item 110 of FIG. 1. This activation occurs at step S1604. Upon activation at step S1604, the processor 122 orchestrates the acquisition and storage in memory 124 (FIG. 1) of the voltages from the coil, shown in FIG. 13d as item 1652. The output of coil 1606, as shown in FIG. 13d, is then subsequently amplified by amplifier 811 of FIG. 13d, then sampled by ADC 812, followed by optional sample and hold 814, before filtering by optional low pass filter 816 and finally storage in memory 124 of FIG. 1 for processing by processor 122, which is an accessory to portable electronic device 138 (FIG. 1).

Referring to FIG. 13b, the ADC process (via ADC 812 of FIG. 13d) samples the coil signal at step S1606 and stores the stream in memory 124 (FIG. 1). In the beginning, a typical profile of coil output during vehicle acceleration is developed. After waiting an acquisition time interval, shown in step S1608, a replica of the vehicle acceleration profile is generated and is used as a correlation standard. Optionally this activity normalizes the acquired data over time; that is, the replica or the recorded stream is stretched over time by repeating data to reveal the shift points, (explained later in FIGS. 13c and 13d), or by throwing away every second data point, or every third, or every two out of three, etc, as is widely known in the art.

An optional/alternate embodiment is shown at step S1612, of FIG. 13b where the current stream of step S1604 is correlated with a stored stream played back at step S1610 from memory 124 (FIG. 1). This stored stream may either be set at the factory a priori, or is created by examining, storing and regularly refining a replica developed from the acceleration history of the vehicle. Therefore, step S1612 correlates the two normalized signals and ascertains whether there exists a stream of coil voltages indicating that the intended use may be in a moving vehicle.

It is understood that a steady stream of pulses essentially of frequencies that correspond to a cruising vehicle would also qualify (this is not shown for clarity of discussion).

Several other means of establishing that the use, or intended use, is to be vehicular. Many combinations or alternate triggers are acceptable for device 110 of FIG. 1. As an example, the combination of sequential shift points, all within 500 RPM of 1000 RPM, 1500 RPM, 2000 RPM, etc.; as another example, sequential shift points that achieve the same RPM.

It is to be noted that sequential signal strengths can be detected and divided by common numbers for cylinders in a vehicle, i.e. 2, 3, 4, 5, 6, 8, and repeating patterns of signal strength are detected in processor 122 of FIG. 1.

Optional step S1616 of FIG. 13b performs a Fast Fourier Transform (FFT) on the stored data, although it may alternately be done 'on-the-fly' by methods that are known in the art. Discrete Fourier Transforms are also anticipated at this step S1616. Either or similar techniques provide for examination of the signal in conjunction with the RPM proximal to the critical points in the RPM data, representing shift points in a vehicular transmission, be it automatic, manual, or combination of both. The spectral information thus derived is correlated in step S1614 to that stored before in step S1606 as a replica of vehicle operation Coil voltages that essentially correlate to vehicular dynamics are deduced to evidence an intent to use in a vehicle. This then forces the proximal operator station thread to be executed, as per FIGS. 3, 4, 5, and 7 supra.

Figure 13C:
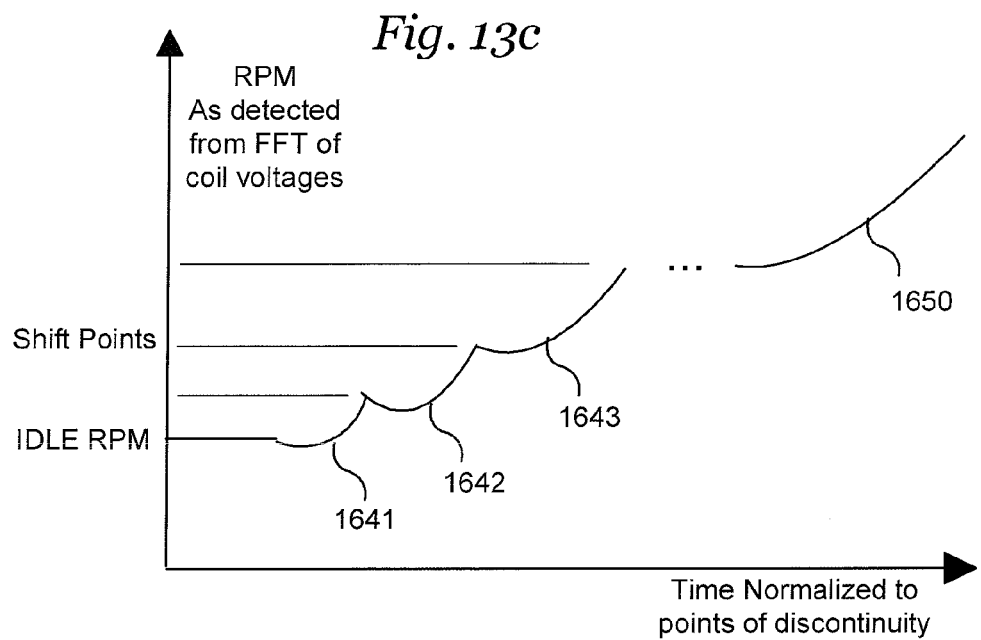
FIG. 13c is a profile indicating engine speed and shift points as detected for the vehicle of FIG. 13.
Figure 13D:
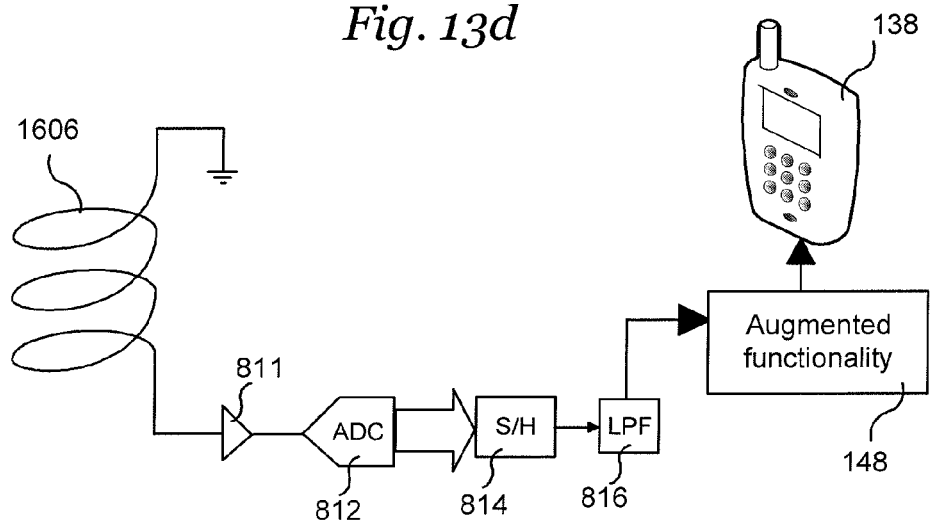
FIG. 13d is a schematic diagram showing an arrangement for handling the signal of the coil illustrated in FIG. 13.

FIG. 13c shows the shift points on an RPM versus time. The time is normalized as previously described. In some embodiments, the RPM shift points are used to assist the normalization in time process, stretching or squeezing the data of the replica generation to match the detected signal from the coil.

Referring to FIG. 13d, the coil is a plurality of turns that subtend some surface interval, of which the orientation is not important.

Figure 13E:
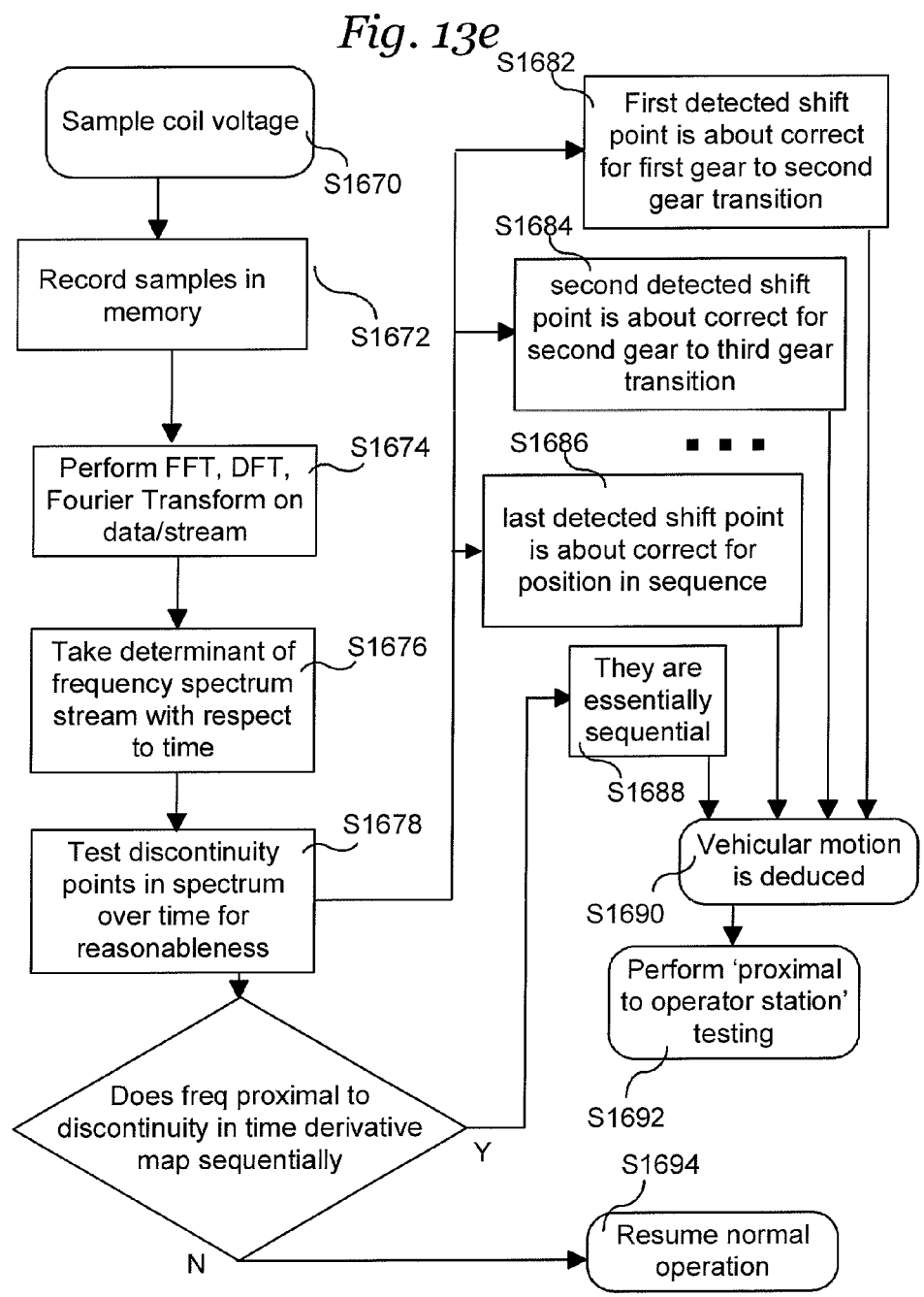
FIG. 13e is a control flow chart associated with FIGS. 13c and 13d.

FIG. 13e represents a control flow chart wherein the coil voltages are sampled in step S1670, and recorded in memory 124 (FIG. 1) at step S1672. Step S1674 performs an FFT on the data, in memory, or in the stream format. This FFT is then differentiated with respect to time. The occurrence of critical points, in the mathematical sense, are compared in time to the proximal values of RPM as they occur or are done in memory, not long after the fact. The RPM sensed of these discontinuity points are compared to the usual expected RPM values to ensure that they are in the ball park. Any combination, or all of the first, second, third expected shift points, the RPM of expected sequential shift points, or the RPM of cruise speed, or the sequentiality of the RPM of switch points, i.e., they descend in RPM, or they ascend, but they typically don't jump, is detected, subjected to a Boolean AND-ing operation at step S1690, and is used to initiate the proximal to operator's station test as described earlier in the disclosure.

Failure of this test, returns control to normal operation at step S1694. In some embodiments the Doppler of a receding or oncoming vehicle is deduced and this thread is returned to step S1694, as no Doppler would be apparent for signals emanating from the same vehicle. Doppler would however, be apparent for 'other proximal vehicles' that would typically be in relative motion. This Doppler detection, of ever smoothly increasing or decreasing due to relative speed is well known in the art, and would be detectable by trace examination by processor means 122 (FIG. 1).

Embodiments of the present disclosure overcome the prior art by offering advantageous frequencies implemented on commonly available processing units.

Embodiments of the present disclosure overcome disadvantages of the prior art by reducing the required hardware substantially. Embodiments of the present disclosure overcome the disadvantages of the prior art by offering alternate arrangements. Software only solutions, on well-known processors, have an inherent ability to be more easily hacked, and thereby circumvented.

Embodiments of the present disclosure inhibit use above a threshold speed or acceleration profile over time, forcing hands-only-use thereby preventing inhibit circumvention through use of a headset, whilst the device is located on the passenger seat, i.e. Bradley "DEVICE AND METHOD FOR DISABLING MOBILE DEVICES", patent application, US2011/0117903.

Finally the present disclosure requires the user to have available a working FM system, or similar, otherwise the portable electronic device will alter services, etc., i.e., inhibit texting, phoning, phoning without a hands-free arrangement, It is understood that this implementation is shown largely in hardware and that similar implementations may be done in software exploiting general purpose aspects of the computational means 122, or otherwise embedded in portable electronic device 138. In such cases the software is considered to configure the hardware elements to effect the above elements and lie within the specification of this disclosure.

It is further understood that many different implementations of the above may be done without deviating from the present disclosure.

Obviously, many modifications and variations of the present invention are possible in light of the above teachings. It is therefore to be understood that within the scope of the appended claims, the invention may be practiced otherwise than as specifically described.

The invention claimed is:

1. An accessory for affecting one or more features of a portable electronic device that can be brought into a vehicle having a radio with a right and a left speaker, the accessory comprising:
   a sender for initiating transmission of an RF test signal at said portable electronic device, said RF test signal being arranged to cause said radio to produce a distinct pair of audio responses from the right and the left speaker; and
   a discriminator for determining for the right and the left speaker the corresponding return delay between transmission of said RF test signal and arrival of the distinct pair of audio responses at said portable electronic device.

2. An accessory according to claim 1 wherein said discriminator is operable to inhibit at least one of the one or more features of the portable electronic device based, at least in part, on the difference between the return delay of the right speaker and the return delay of the left speaker.

3. An accessory according to claim 1 wherein said discriminator is operable to inhibit at least one of the one or more features of the portable electronic device only if the return delay of the right speaker exceeds the return delay of the left speaker by a predetermined amount.

4. An accessory according to claim 1 wherein said discriminator is operable to inhibit at least one of the one or more features of the portable electronic device if (a) the return delay of the right speaker exceeds the return delay of the left speaker by a predetermined amount, and (b) the return delay of at least one of the right speaker and the left speaker is less than a predetermined limit.

5. An accessory according to claim 4 wherein said portable electronic device is a cell phone and said discriminator is operable to inhibit telephonic communication and texting with said cell phone.

6. An accessory according to claim 1 wherein said portable electronic device has an acoustic transducer, said discriminator being coupled to said acoustic transducer in order to detect arrival of the distinct pair of audio responses at said portable electronic device.

7. An accessory according to claim 1 wherein said sender is operable to send an RF probe signal that changes frequency over time with a resolution sized to ensure arrival at a sensitive frequency to which the radio is tuned, said discriminator being operable to detect a change in sound from the right and the left speaker caused by said RF probe signal, said sender being operable to initiate transmission of said RF test signal at said sensitive frequency.

8. An accessory according to claim 7 wherein said RF probe signal is arranged to mute said radio at said sensitive frequency, said discriminator being operable to detect a cessation of sound from the right and the left speaker caused by said RF probe signal.

9. An accessory according to claim 1 comprising:
   a motion detector coupled to said sender for detecting motion of the vehicle and enabling said sender upon the vehicle moving in a predetermined manner.

10. An accessory according to claim 9 wherein said motion detector is an accelerometer.

11. An accessory according to claim 9 wherein said motion detector is a listening circuit for detecting sounds signifying vehicle motion.

12. An accessory according to claim 9 wherein said motion detector is a GPS system.

13. An accessory according to claim 9 wherein said motion detector is an RF listening circuit for detecting RF stray signals signifying vehicle motion.

14. An accessory according to claim 9 wherein said motion detector is operable to detect cessation of motion of the vehicle and disable said sender upon the vehicle ceasing movement for a predetermined interval.

15. An accessory according to claim 1 wherein said RF test signal is a frequency modulated signal carrying information for a right and left channel.

16. An accessory according to claim 15 wherein said right and left channel are capable of carrying information representing sounds in the upper octave of human hearing, said right and left channel each carrying information representing a tone burst located in the upper octave of human hearing.

17. An accessory according to claim 16 wherein said right and left channel each carry information representing a tone burst with a frequency content centered at a frequency in the range of 14 to 15 kHz.

18. An accessory according to claim 15 wherein said right and left channel each carry information representing a tone burst at different times.

19. An accessory according to claim 15 wherein said right and left channel each carry information representing an encoded signal.

20. An accessory according to claim 15 wherein said discriminator creates a delayed replica of the distinct pair of audio responses.

21. An accessory according to claim 20 wherein said discriminator correlates the delayed replica of the distinct pair of audio responses with the distinct pair of audio responses actually arriving at said portable electronic device, said delayed replica being delayed by a preprogrammed amount.

22. An accessory according to claim 20 wherein said discriminator performs a phase comparison between the delayed replica of the distinct pair of audio responses and the distinct pair of audio responses actually arriving at said portable electronic device, said delayed replica being delayed by a preprogrammed amount.

23. An accessory according to claim 1 wherein said sender comprises:
   a processor for producing a right and a left audio signal; and
   an FM modulator for producing the RF test signal modulated to carry the right and the left audio signal.

24. An accessory according to claim 1 wherein said sender comprises:
   a processor for producing a pilot tone, a first audio signal on a subcarrier and a second audio signal;
   a summing circuit for producing a sum signal signifying the sum of the pilot tone, the first audio signal and the second audio signal;
   an FM modulator for producing the RF test signal modulated by the sum signal.

25. An accessory according to claim 1 wherein said sender comprises:
   a processor for producing sum signal signifying the summation of a pilot tone, a first audio signal on a subcarrier and a second audio signal;

an FM modulator for producing the RF test signal modulated by the sum signal.

26. An accessory according to claim 1 wherein said accessory is arranged to defeat deception with a handheld radio having a relatively reduced bass audio content, the accessory comprising:
an analyzer coupled to said discriminator for determining bass audio content of the distinct pair of audio responses at said portable electronic device, said analyzer being operable to nullify the discriminator if the distinct pair of audio responses has an audio bass content less than a predetermined standard.

27. An accessory according to claim 1 wherein the radio has four quadraphonic channels with an additional spaced pair of rear speakers, said RF test signal being arranged to cause said radio to produce a distinct pair of audio responses from the right and the left speaker, and a distinguishable pair of audio returns from said additional spaced pair of rear speakers.

28. A method for affecting one or more features of a portable electronic device that can be brought into a vehicle having a radio with a right and a left speaker, the method comprising the steps of:
initiating transmission of an RF test signal at said portable electronic device, said RF test signal being arranged to cause said radio to produce a distinct pair of audio responses from the right and the left speaker; and
determining for the right and the left speaker the corresponding return delay between transmission of said RF test signal and arrival of the distinct pair of audio responses at said portable electronic device.

29. A method according to claim 28 comprising the step of:
inhibiting at least one of the one or more features of the portable electronic device based, at least in part, on the difference between the return delay of the right speaker and the return delay of the left speaker.

\* \* \* \* \*